United States Patent  
Douris et al.

(10) Patent No.: US 9,288,079 B2
(45) Date of Patent: Mar. 15, 2016

(54) VIRTUAL NOTES IN A REALITY OVERLAY

(75) Inventors: Stephan Douris, San Jose, CA (US);
Barry Crane, Menlo Park, CA (US);
Marc Perry, San Francisco, CA (US);
Athellina Athsani, San Jose, CA (US);
Chris Kalaboukis, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 544 days.

(21) Appl. No.: 13/360,415

(22) Filed: Jan. 27, 2012

(65) Prior Publication Data

US 2012/0131435 A1 May 24, 2012

Related U.S. Application Data

(62) Division of application No. 12/177,983, filed on Jul. 23, 2008.

(51) Int. Cl.
*G06F 3/048* (2013.01)
*H04L 12/64* (2006.01)
*G06F 3/0484* (2013.01)
*G06F 3/0481* (2013.01)
*G06F 3/01* (2006.01)
*H04L 12/58* (2006.01)
*H04W 4/02* (2009.01)
(Continued)

(52) U.S. Cl.
CPC .............. *H04L 12/6418* (2013.01); *G06F 3/01* (2013.01); *G06F 3/0481* (2013.01); *G06F 3/0484* (2013.01); *G06F 3/1415* (2013.01); *G06F 5/14* (2013.01); *G09G 2370/16* (2013.01); *H04L 12/58* (2013.01); *H04W 4/02* (2013.01)

(58) Field of Classification Search
CPC ............. G06F 3/00; G06F 3/01; G06F 3/005; H04L 12/58; H04W 4/02
USPC .......................................... 345/629; 715/757
See application file for complete search history.

(56) References Cited

U.S. PATENT DOCUMENTS 5,938,721 A * 8/1999 Dussell et al. ................. 701/468
6,222,583 B1 * 4/2001 Matsumura ........ G01C 21/3635 345/619
6,243,054 B1 6/2001 DeLuca
(Continued)

OTHER PUBLICATIONS

"Virtual Notes organizer software", retrieved from <http://www.morun.net/www/virtual-notes-desktop.html>, downloaded on Mar. 21, 2010, 3 pages.
(Continued)

*Primary Examiner* — William Bashore
*Assistant Examiner* — Gregory A Distefano
(74) *Attorney, Agent, or Firm* — James J. DeCarlo; Greenberg Traurig, LLP

(57) ABSTRACT

Virtual notes are provided that enable virtual communications between users. A user is enabled to input content into a note using an electronic device. The user is enabled to associate a virtual representation of the note with an entity to generate a virtual note. The user is enabled to position the virtual representation of the virtual note in a virtual space superimposed on the entity. The user is enabled to configure at least one attribute associated with the virtual note. The generated virtual note is transmitted to a notes database. Subsequent users can view and otherwise interact with the virtual note by interacting with the entity associated with the virtual note. For example, the subsequent users can interact with the virtual note by approaching the entity, or by viewing the entity on a map displayed by an electronic device.

11 Claims, 18 Drawing Sheets

(51) Int. Cl.
*G06F 3/14* (2006.01)
*G06F 5/14* (2006.01)

(56) References Cited

U.S. PATENT DOCUMENTS

| | | | |
|---|---|---|---|
| 6,504,956 B1 | 1/2003 | Gannage et al. | |
| 6,559,813 B1 | 5/2003 | DeLuca et al. | |
| 6,606,657 B1 | 8/2003 | Zilberstein et al. | |
| 7,031,875 B2 * | 4/2006 | Ellenby | G01C 21/20 702/150 |
| 7,088,389 B2 * | 8/2006 | Shibasaki | G01C 21/20 348/116 |
| 7,564,469 B2 | 7/2009 | Cohen | |
| 7,720,436 B2 * | 5/2010 | Hamynen | G06F 3/147 348/116 |
| 2005/0091578 A1 | 4/2005 | Madan et al. | |
| 2005/0192853 A1 | 9/2005 | Ebert et al. | |
| 2007/0073776 A1 | 3/2007 | Kalalian et al. | |
| 2007/0220042 A1 | 9/2007 | Mueller et al. | |
| 2007/0242131 A1 * | 10/2007 | Sanz-Pastor et al. | 348/14.02 |
| 2007/0281690 A1 * | 12/2007 | Altman et al. | 455/435.1 |
| 2008/0040036 A1 | 2/2008 | Peters et al. | |
| 2008/0045138 A1 | 2/2008 | Milic-Frayling et al. | |
| 2008/0109713 A1 | 5/2008 | Frank et al. | |
| 2009/0132583 A1 | 5/2009 | Carter et al. | |
| 2009/0132641 A1 | 5/2009 | Sanguinetti et al. | |
| 2009/0289955 A1 | 11/2009 | Douris et al. | |
| 2010/0023878 A1 | 1/2010 | Douris et al. | |

OTHER PUBLICATIONS

Geopepper mobile social network, "The New Way to Connect", retrieved from <http://geopepper.com/gms/prelogin/launch.jsp>, downloaded on Aug. 26, 2008, 1 page.

"Post-it Digital Notes", retrieved from <http://www.3m.com/us/office/postit/digital/digital_notes.html?WT.mc_id=www. post-it. co>, downloaded on Mar. 21, 2010, 1 page.

Geopepper FAQ Page, retrieved from <http://geopepper.com/gms/prelogin/FAQs.jsp>, downloaded on Aug. 26, 2008, 9 pages.

* cited by examiner

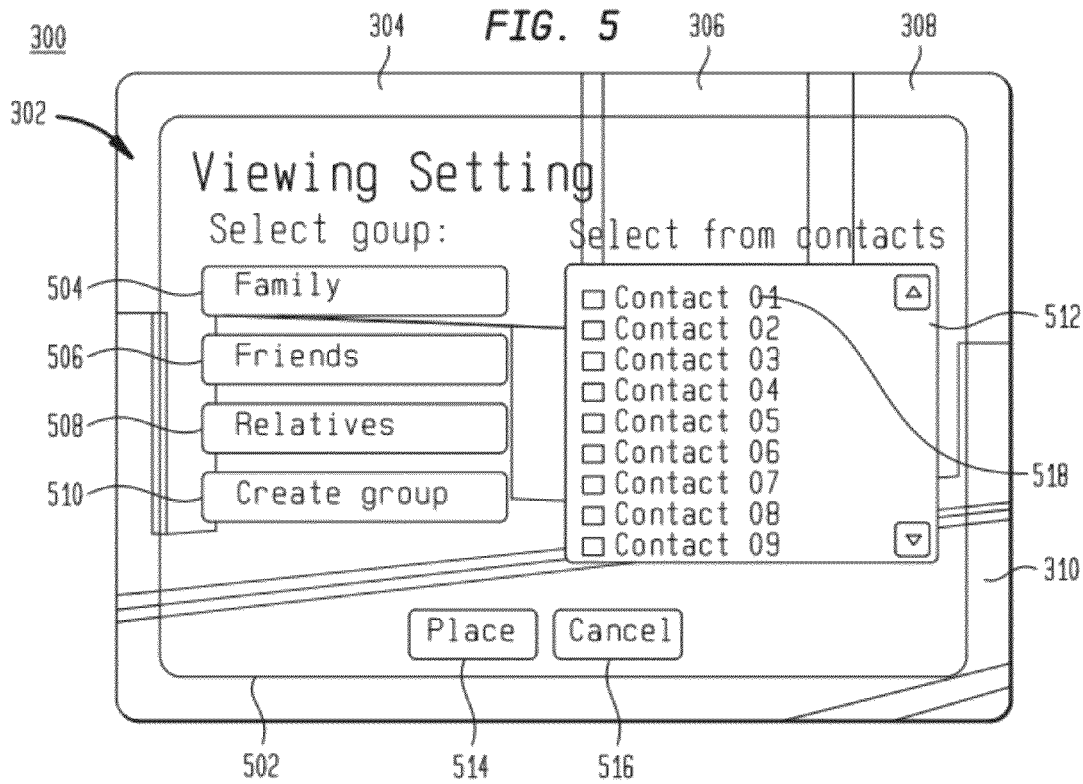
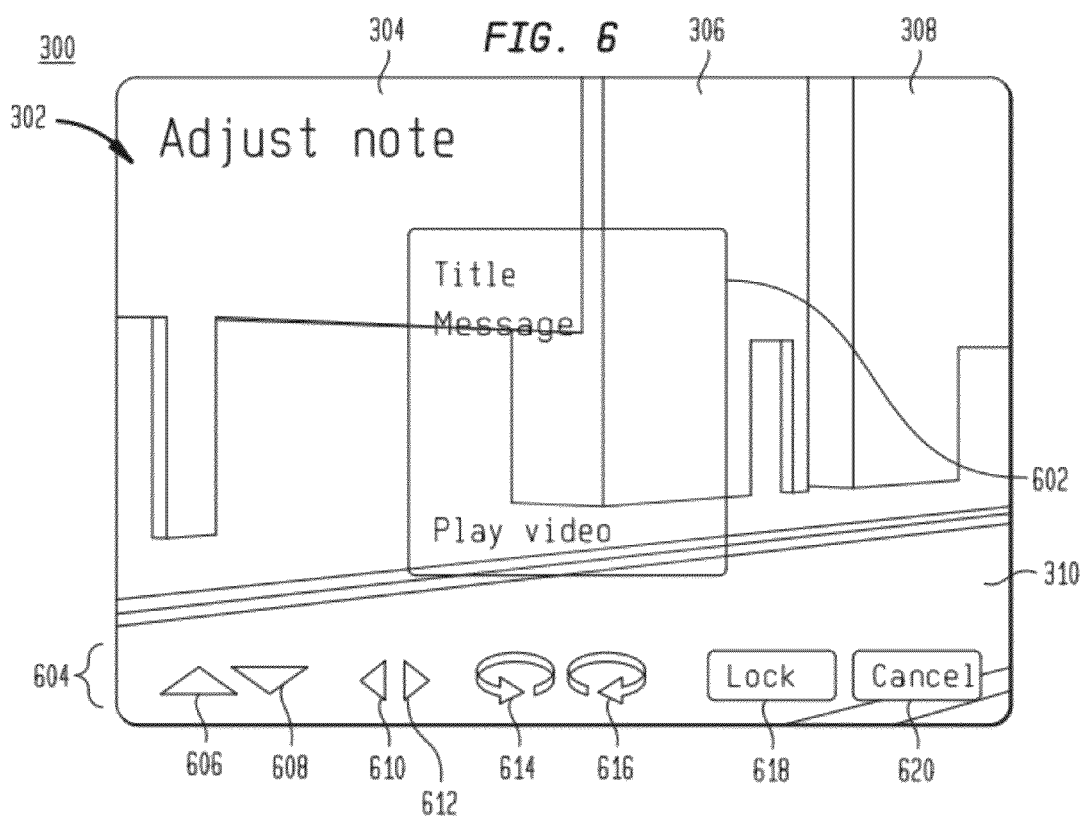

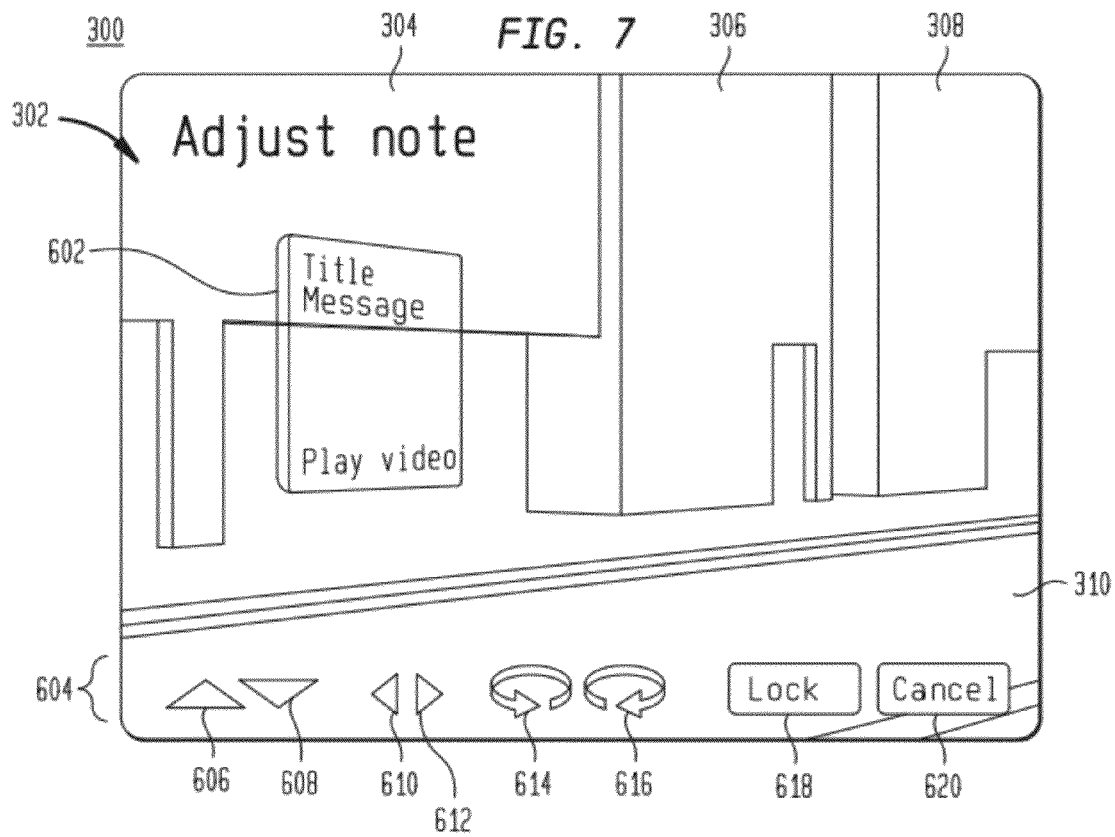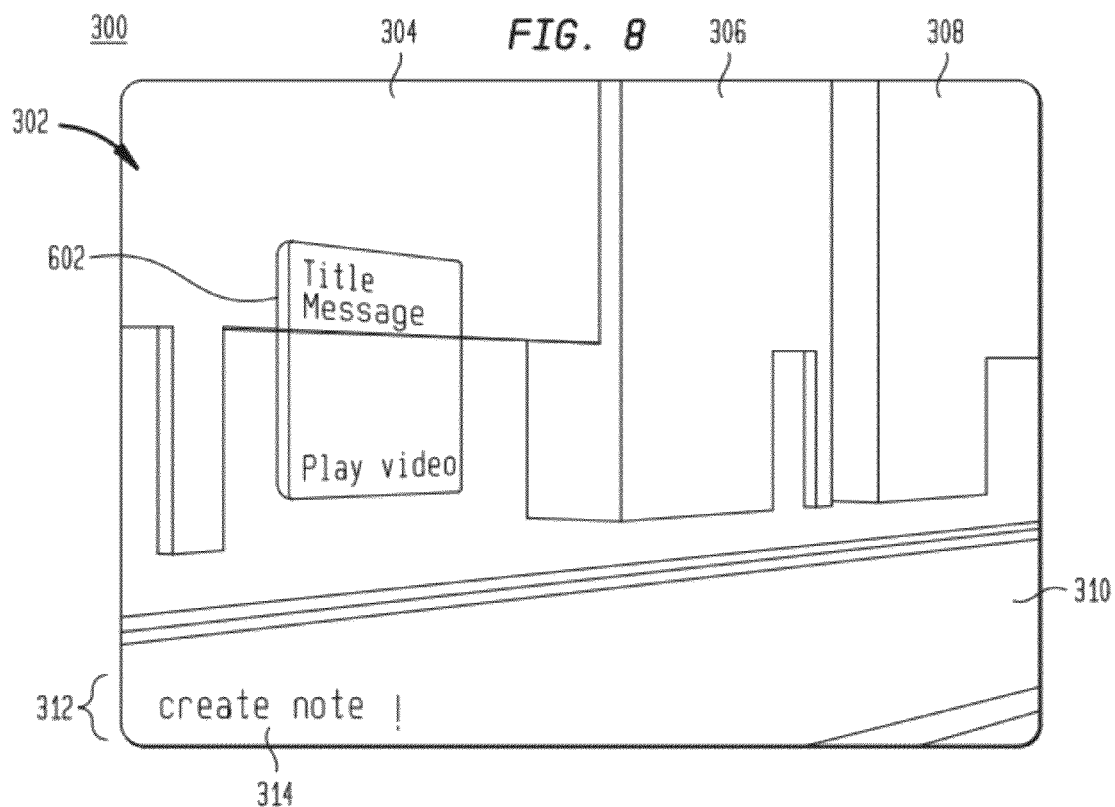

VIRTUAL NOTES IN A REALITY OVERLAY

This application is a divisional of pending U.S. application Ser. No. 12/177,983, filed on Jul. 23, 2008, which is incorporated by reference herein in its entirety.

BACKGROUND OF THE INVENTION

1. Field of the Invention

The present invention relates to electronic communications through entity-associated electronic messages.

2. Background Art

Various ways exist for persons to provide messages to other persons. For example, email has become a very popular manner for people to communicate in both business and social contexts. With email, a user composes a message using an email tool, selects one or more recipients to receive the message, enters an email address for each recipient, and sends the email. The email is transmitted over a communications network, such as the Internet, and is stored in the mailbox of each recipient. At some point in time, each recipient accesses the received email in their corresponding mailbox.

Text messaging has also become very popular in recent years. Text messaging, or "texting," is the sending of short amounts of text (e.g., 160 characters or less) from a first person at a first electronic device, such as a cell phone, to a predefined recipient at a second electronic device. Text messaging is available on many digital mobile phones and other electronic devices configured for wireless communications.

Both email and text messaging communication techniques are direct person-to-person communication techniques, where a message is sent directly to one or more predefined recipients. Further ways are desired to perform communications that enable messages to be generated and provided to recipients in a less direct manner, such as in a manner based on a context of the sender and recipients, rather than merely transmitting each message directly to each predefined recipient.

BRIEF SUMMARY OF THE INVENTION

Virtual notes are provided that enable virtual communications between users. A virtual note includes content (e.g., in digital form) and may be virtually superimposed on designated coordinates within a given real world space. For instance, the virtual note can be associated with a fixed location based on fixed coordinates or variable coordinates, or can be associated with a variable location based on fixed coordinates or variable coordinates. In this manner, a virtual note can be associated with a stationary entity, such as a geographical location or an object having a fixed location, or with a mobile entity, such as a mobile object (e.g., a car or other vehicle, a mobile electronic device, etc.) or a living being (e.g., a human or animal).

A user is enabled to input content into a note using an electronic device. The user is enabled to associate a virtual representation of the note with an entity such as geographical location, an object (e.g., a product), or a living being, to generate a virtual note. The user is enabled to position the virtual representation of the virtual note in a virtual space superimposed on the entity. The user may further be enabled to configure at least one attribute associated with the virtual note.

The generated virtual note is transmitted to a notes database. Subsequent users can view and otherwise interact with the virtual note by interacting with the entity associated with the virtual note. For example, a subsequent user can interact with the virtual note by approaching the entity, and/or if the entity is viewable by geographical location, by viewing the location on a map displayed by an electronic device.

For instance, an interaction of a user with an entity may be detected. One or more notes associated with the entity are determined. An alert signal is transmitted to an electronic device of the user to indicate the one or more notes associated with the entity. In response to the alert, a request may be received from the electronic device for a note of the one or more notes. The requested note is transmitted to the electronic device. The transmitted note includes position information configured to enable the electronic device to display a virtual representation of the note superimposed on the entity. The user may be enabled to add a comment to the note.

Note that prior to transmitting the alert signal, the determined one or more notes may be filtered based on at least one attribute associated with the determined one or more notes.

In another implementation, an electronic device is provided. The electronic device includes a display, a user interface, a notes processing module, and a rendering module. The user interface is configured to enable a user to input note content. The user interface may also be configured to enable a user to edit or delete note content. The note processing module is configured to receive the note content from the user interface, to generate a note that includes the note content, and to associate an entity with the note. The rendering module is configured to generate a virtual representation of the note to be displayed by the display. The virtual representation is displayed in a virtual space superimposed on the entity. The user interface is configured to enable the user to position the virtual representation of the note in the virtual space.

In still another implementation, a notes engine is provided. The notes engine includes an entity comparator and a notes manager. The entity comparator is configured to receive an indication of an interaction of a user with an entity, and to determine one or more notes associated with the entity that are stored in a notes database. In one implementation, the entity comparator may be a location comparator configured to determine the one or more notes based on a location of the user. The notes manager is configured to transmit an alert signal to an electronic device of the user to indicate the one or more notes associated with the entity. The notes manager is configured to receive a request from the electronic device for a note of the one or more notes in response to the alert, and to transmit the requested note to the electronic device. The transmitted requested note includes position information configured to enable the electronic device to display a virtual representation of the note superimposed on the entity.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 3-8 show various example images and graphical interfaces displayed by an electronic device when generating a virtual note, according to example embodiments of the present invention.

FIGS. 11, 12, 14, and 15 show various example images and graphical interfaces displayed by an electronic device when interacting with a virtual note, according to example embodiments of the present invention.

Figure 16:
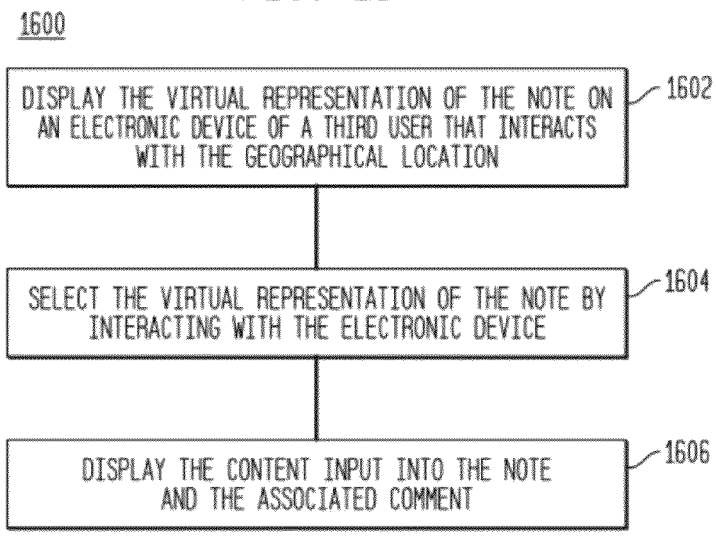

FIG. 16 shows a flowchart for interacting with a virtual note, according to an example embodiment of the present invention.

Figure 17:
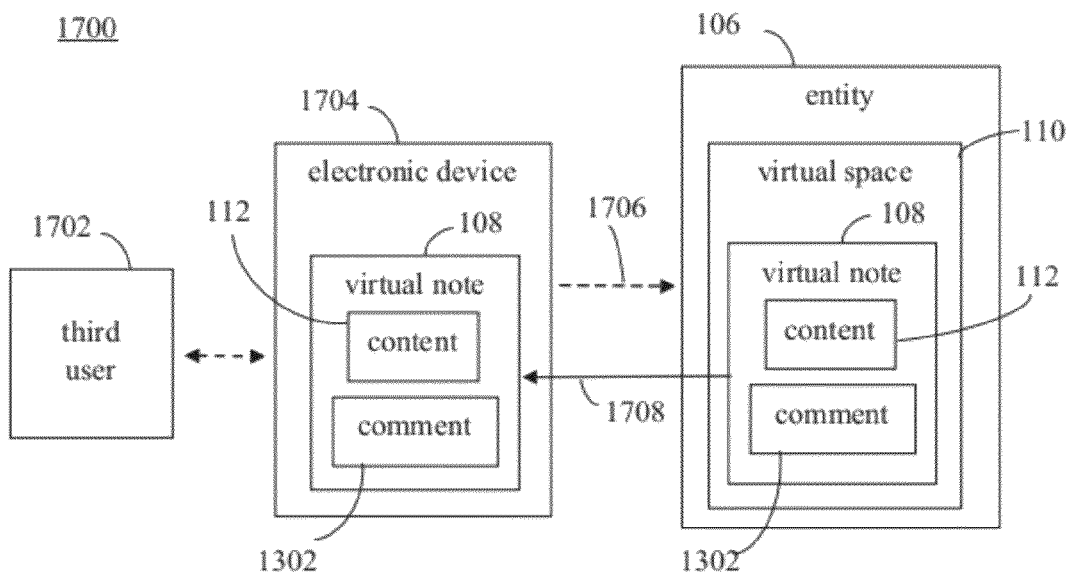

FIG. 17 shows a block diagram of a system for interacting with a virtual note, according to an example embodiment of the present invention.

Figure 18:
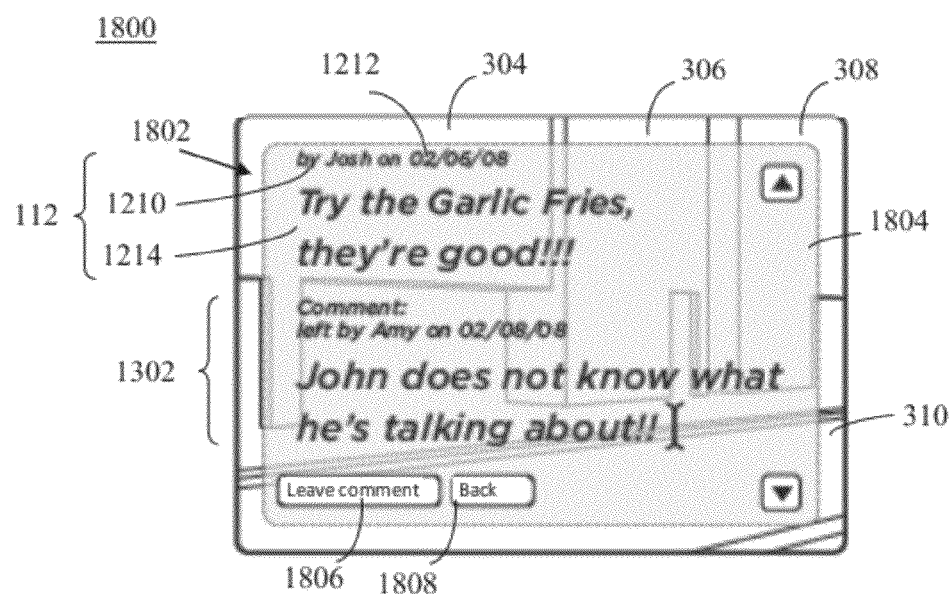

FIG. 18 shows a graphical interface displayed by a display of an electronic device to enable virtual note content and comments to be viewed, according to an example embodiment of the present invention.

Figure 19:
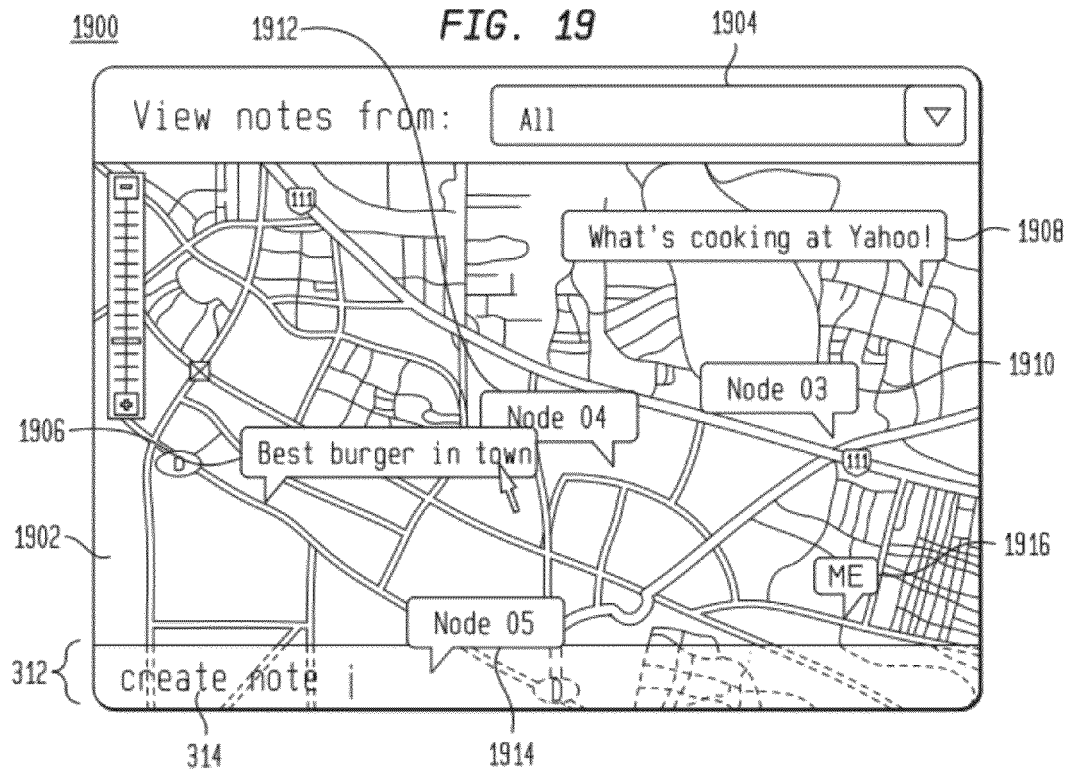
Figure 21:
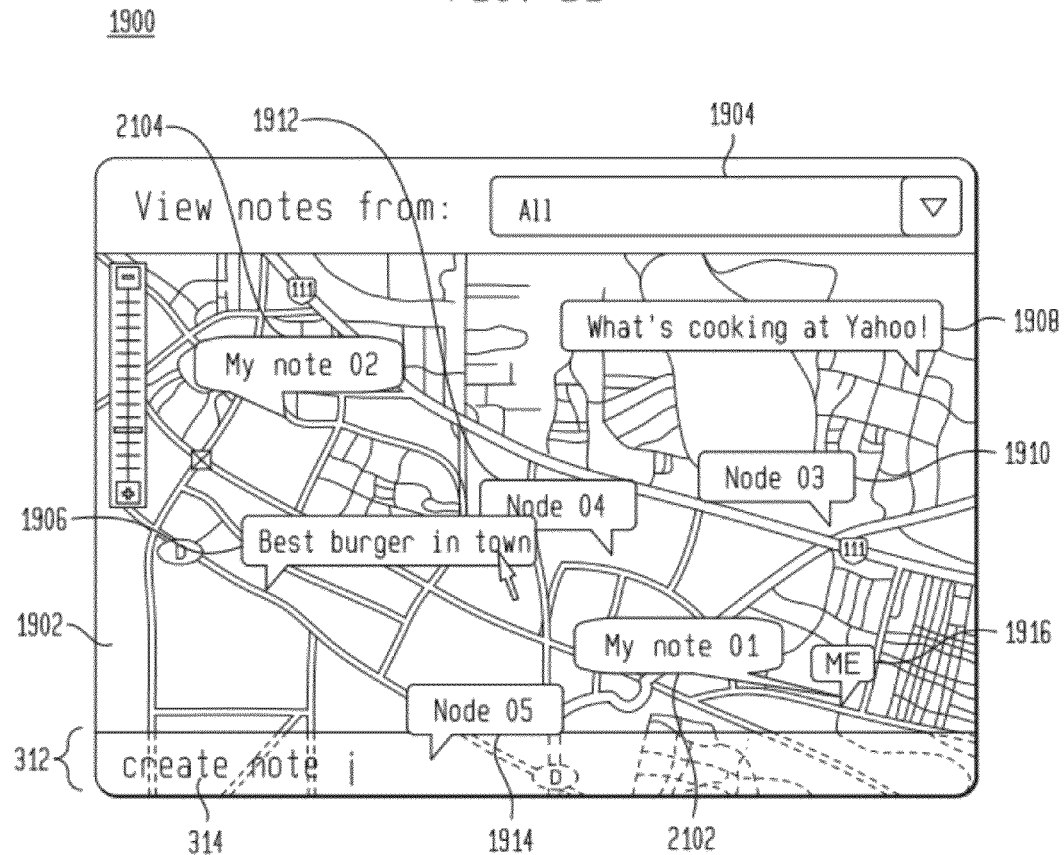

FIGS. 19 and 21 show a map displayed by an electronic device that has virtual note indicators overlaid thereupon, according to example embodiments of the present invention.

Figure 20:
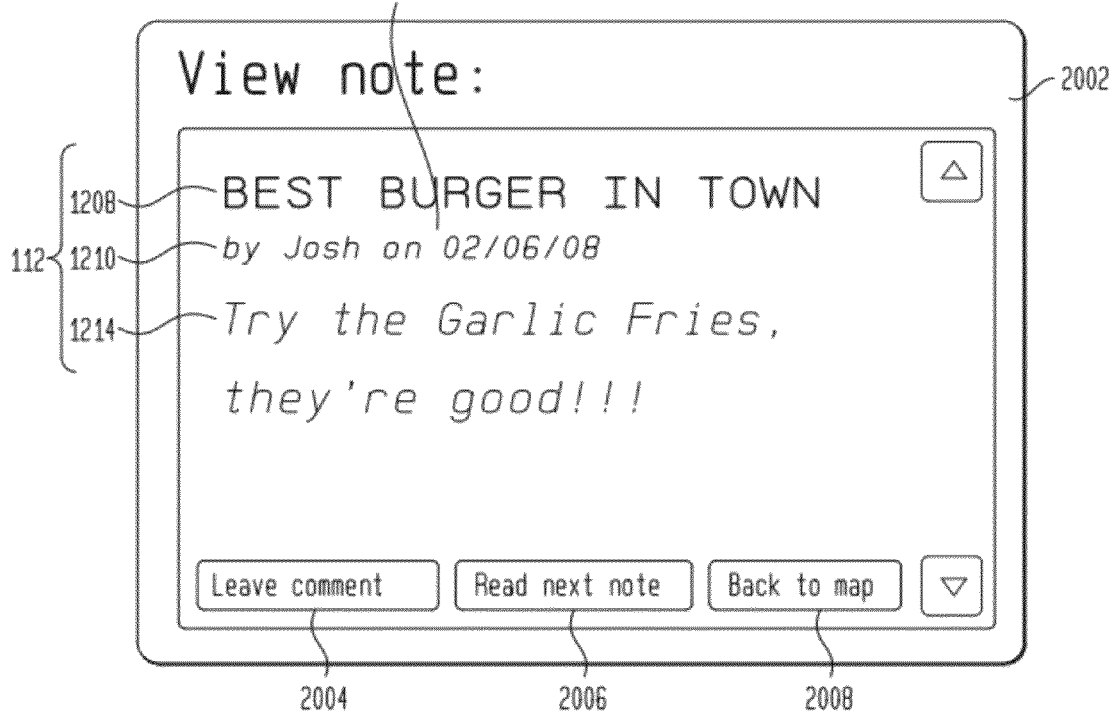

FIG. 20 shows a graphical interface displayed by a display of an electronic device to enable virtual note content and comments to be viewed, according to an example embodiment of the present invention.

Figure 22:
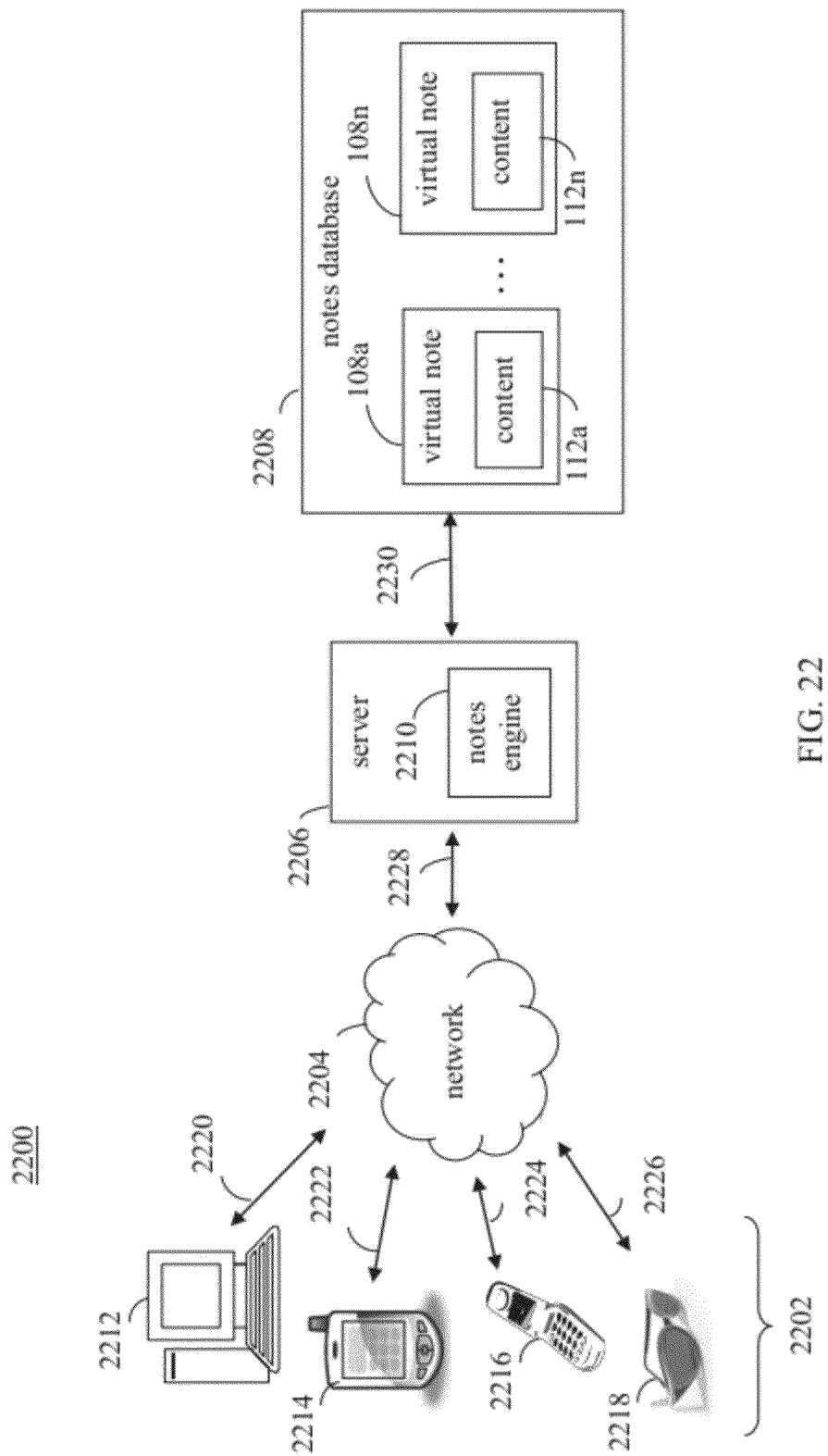

FIG. 22 shows a block diagram of a virtual notes communication system, according to an embodiment of the present invention.

Figure 23:
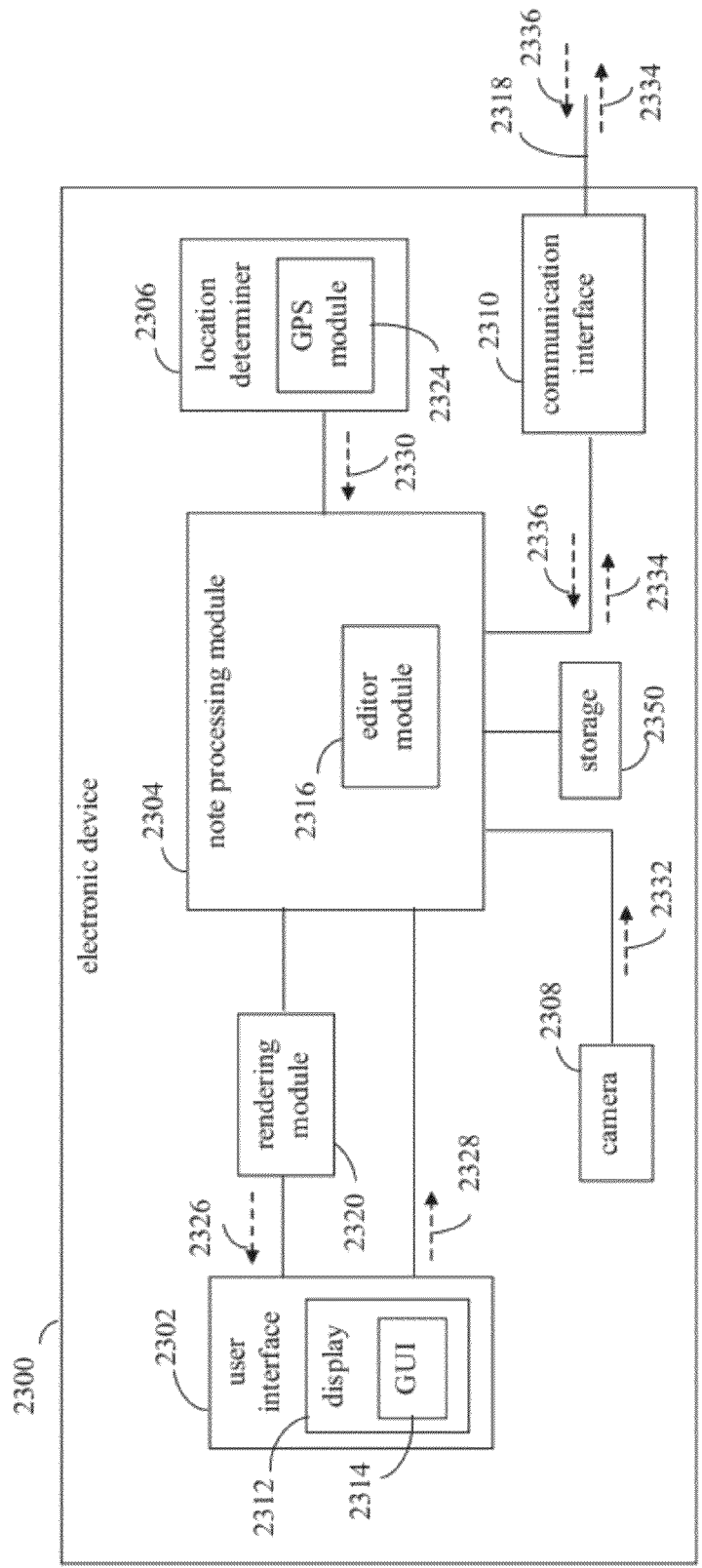

FIG. 23 shows a block diagram of an electronic device, according to an example embodiment of the present invention.

Figure 24:
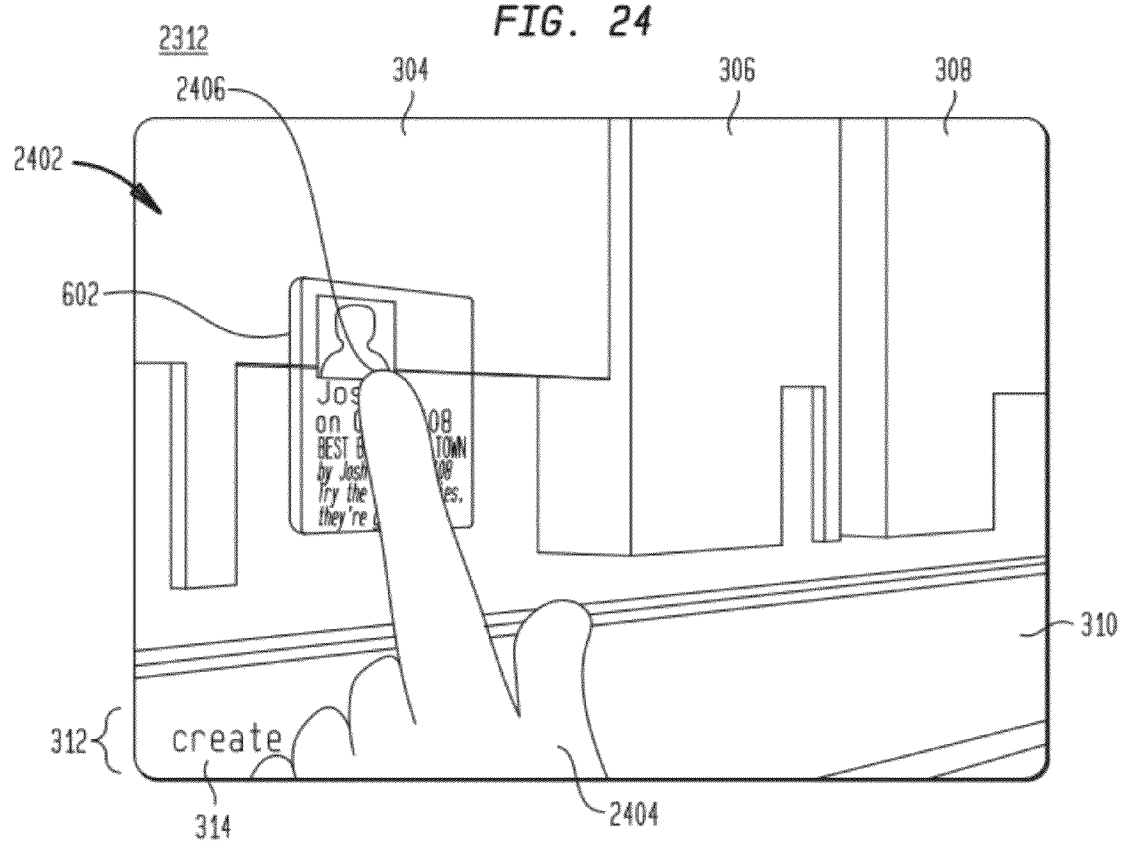

FIG. 24 shows an example of a user interface that enables a user to interact with a virtual representation of a virtual note, according to an embodiment of the present invention.

Figure 25:
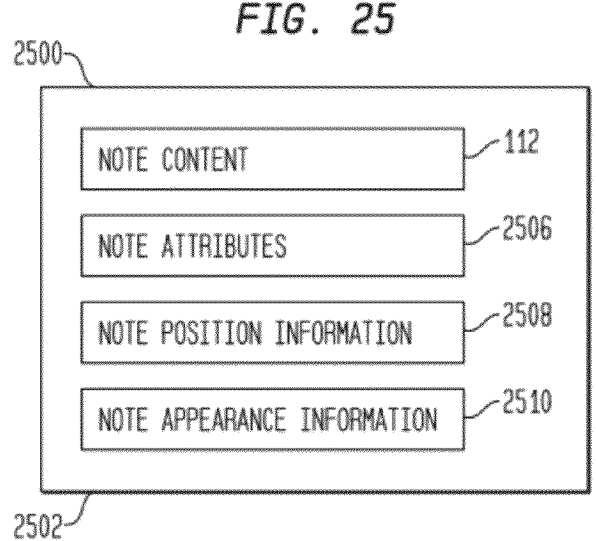

FIG. 25 shows a block diagram of a virtual note, according to an example embodiment of the present invention.

Figure 26:
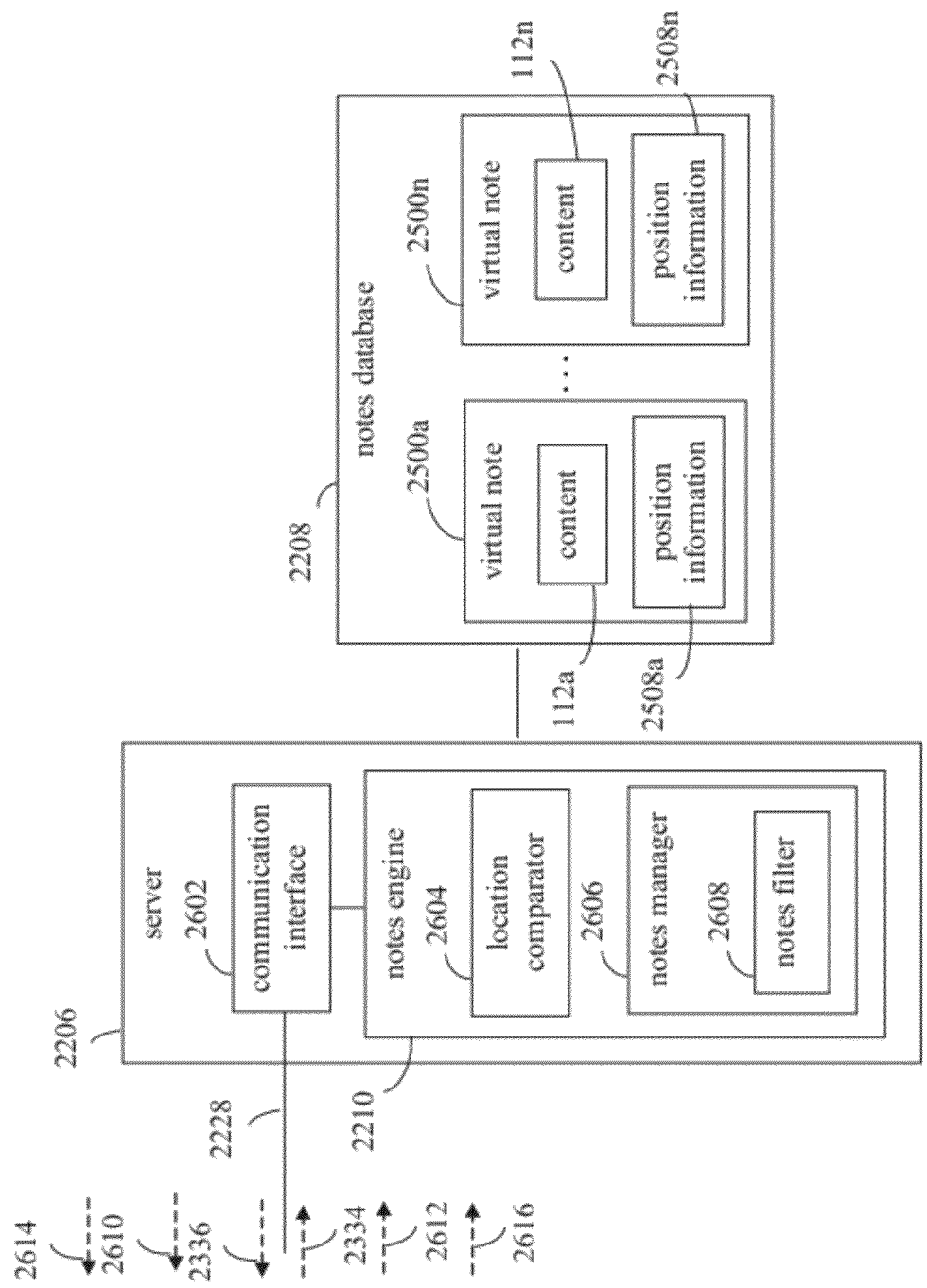

FIG. 26 shows a block diagram of a notes engine and a notes database, according to an example embodiment of the present invention.

Figure 27:
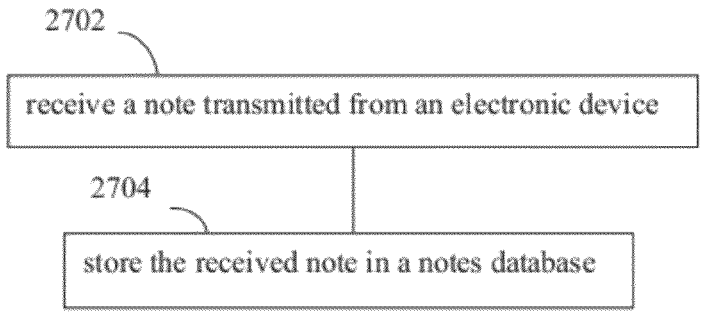

FIG. 27 shows a flowchart that provides an example process for storing virtual notes, according to an embodiment of the present invention.

Figure 28:
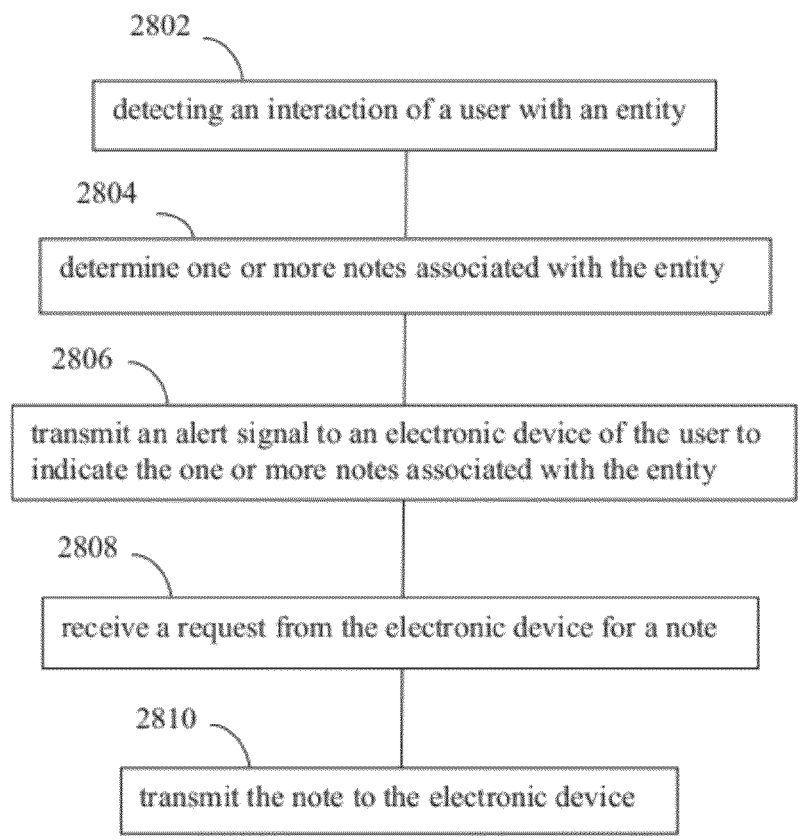

FIG. 28 shows a flowchart that provides an example process for enabling electronic devices to interact with virtual notes, according to an embodiment of the present invention.

Figure 29:
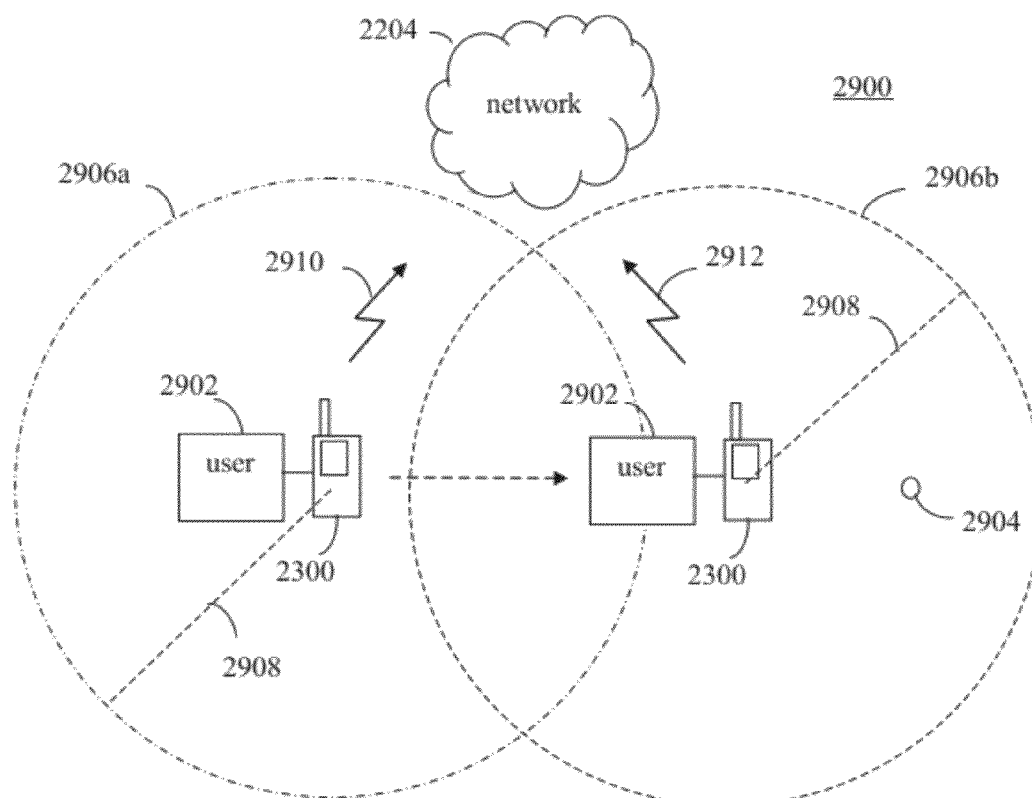

FIG. 29 shows an environment in which a user may move with an electronic device, according to an example embodiment of the present invention.

Figure 30:
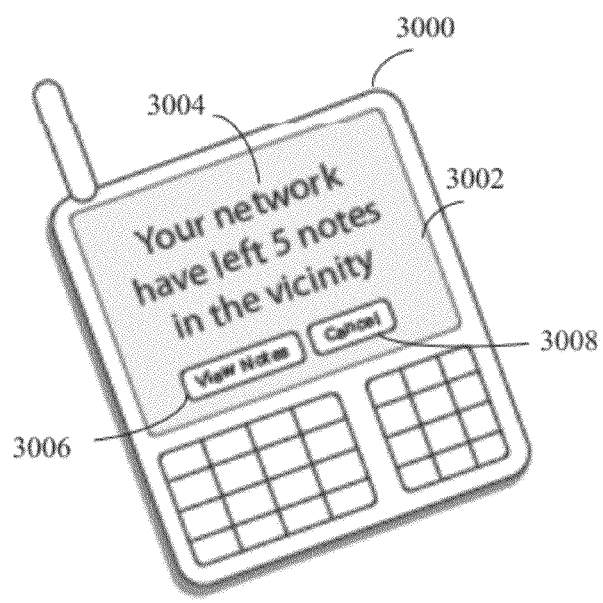

FIG. 30 shows an example electronic device having a display that shows an alert message, according to an example embodiment of the present invention.

Figure 31:
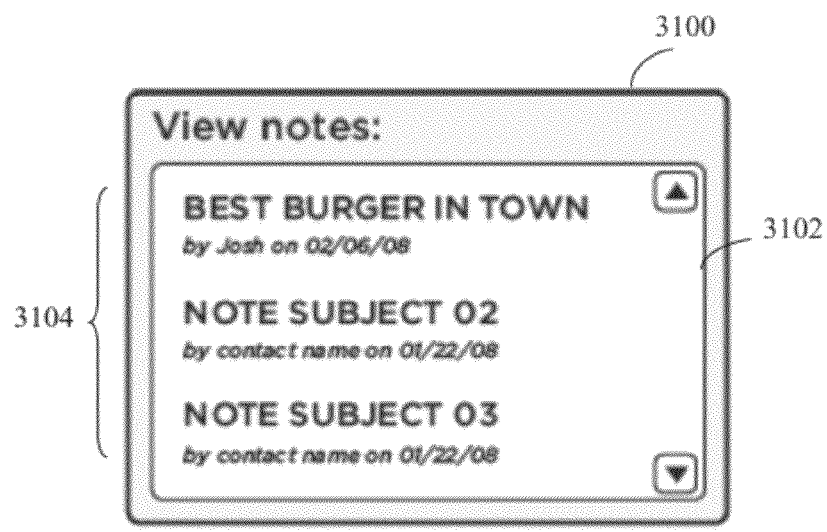

FIG. 31 shows a display of an electronic device that shows a user interface providing a list of received virtual notes, according to an example embodiment of the present invention.

Figure 32:
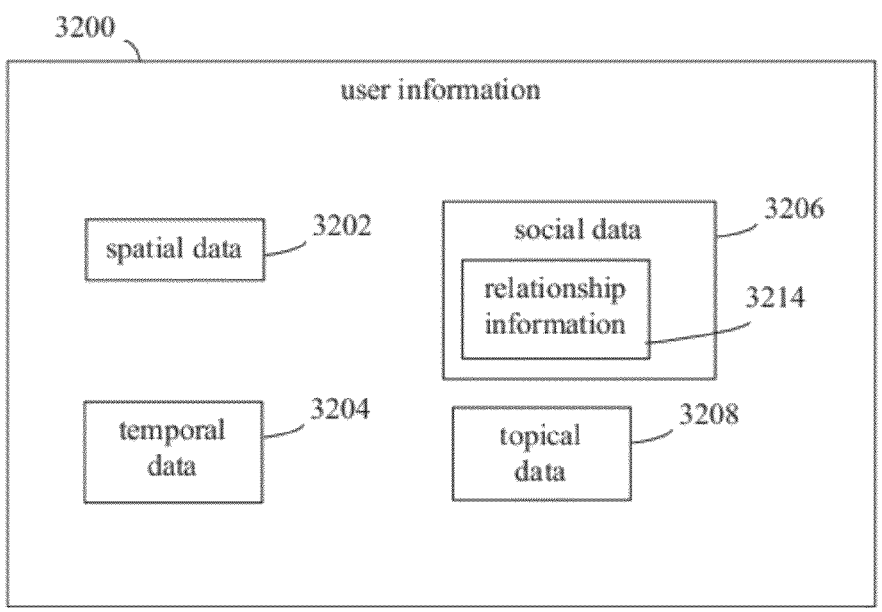

FIG. 32 shows a block diagram of user information that may be associated with users that access virtual notes, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments are described herein that enable electronic messages to be provided to recipients based on attributes of the recipients, rather than merely directly sending each message to each predefined recipient. According to embodiments, virtual notes are generated and associated with entities, such as geographical locations, objects (e.g., a product), and/or living beings (e.g., a human, an animal such as a pet, etc.). Further, users that interact with the entity may receive the virtual note. For example, such users may be able to view the note in a three-dimensional context, where a virtual representation of the virtual note is overlaid on a display of the entity. In embodiments, users that may receive and interact with the note may be filtered based on attributes of the virtual note and/or users.

Such virtual notes enable many forms of communication. For instance, a user may directly annotate a location, an event, or a person with a virtual note. Virtual notes enable a user to indicate where the user is at any particular moment in time. Furthermore, virtual notes provide effective and environmentally-friendly ways of leaving notes (e.g., no paper wastage). Example embodiments regarding virtual notes are described in the following sections.

II. Example Embodiments for Generating Virtual Notes

Figure 1:
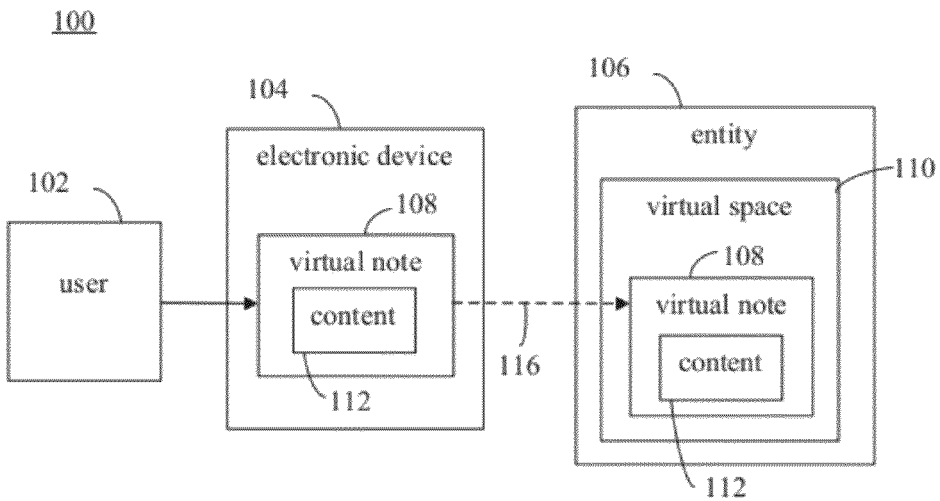
FIG. 1 shows a block diagram of a system for generating a virtual note, according to an example embodiment of the present invention.
Figure 2:
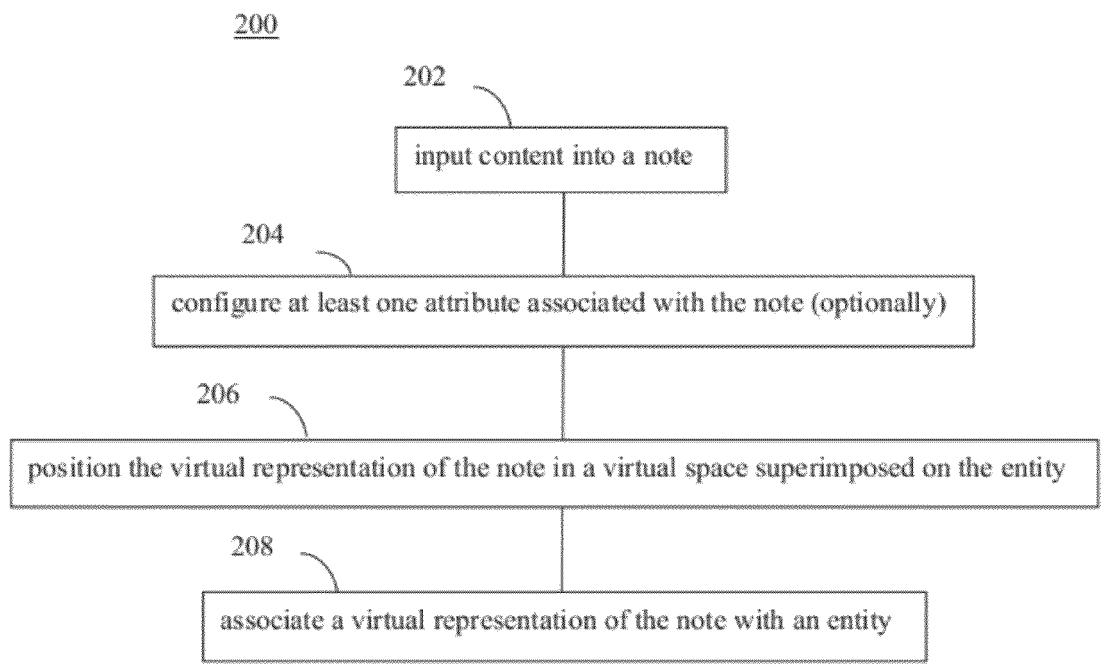
FIG. 2 shows a flowchart for generating a virtual note, according to an example embodiment of the present invention.

FIG. 1 shows a block diagram of a system 100 for generating a virtual note 108, according to an example embodiment of the present invention. In FIG. 1, a user 102 interacts with an electronic device 104 to generate virtual note 108, and to associate virtual note 108 with an entity 106. Electronic device 104 may be any type of suitable electronic device, including a personal computer, a mobile computer (e.g., a laptop computer, a notebook computer, a handheld computer such as a personal digital assistant (PDA) or a Palm™ device, etc.), a cell phone, a workstation, an electronic device worn by or implanted in user 102 (e.g., one or more bio-chip embedded in one or both eyes of user 102), etc. FIG. 2 shows a flowchart 200 for generating a virtual note, according to an example embodiment of the present invention. Flowchart 200 may be performed in system 100 shown in FIG. 1 to generate virtual note 108, for example. Further structural and operational embodiments will be apparent to persons skilled in the relevant art(s) based on the discussion regarding flowchart 200. The steps of flowchart 200 may be performed in an order other than shown in FIG. 2. For illustrative purposes, flowchart 200 is described as follows with respect to system 100, and with respect to FIGS. 3-8, which show various views of a display of electronic device 104.

Figure 3:
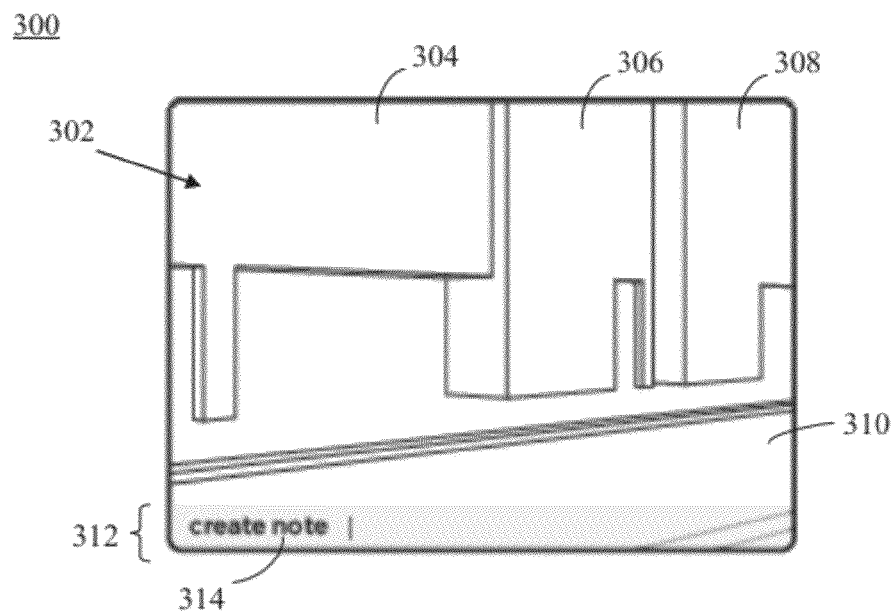

For example, FIG. 3 shows a display 300, which is an example display device for electronic device 104, and shows an image 302 displayed by display 300. In an embodiment, electronic device 104 includes a camera used to capture image 302. Display 300 may have any suitable size, and may be any type of display device. For example, display 300 may be a cathode ray tube (CRT) display (e.g., in the case where electronic device 104 is a desktop computer), a liquid crystal display (LCD) display, plasma display, or other type. Display 300 may be sized for a desktop or laptop computer (e.g., having a diagonal length of 8 inches or greater), or may be configured for a handheld device, such as a cell phone, PDA, smart phone, or other handheld device type. In another embodiment, display 300 may be integrated in a lens (or two lenses) of a pair of glasses or goggles, or may interfaced directly with one or both eyes (e.g., image 302 is displayed on one or both retinas) of user 102.

Image 302 displayed by display 300 in FIG. 3 is an example image captured by the camera of electronic device 104. As shown in FIG. 3, image 302 includes a view of real world entities, such as a billboard 304, a first building 306, a second building 308, and a street 310. In alternative embodiments, any of these objects may be virtual objects generated by electronic device 104 for display in image 302. Display 300 also may display one or more graphical interface elements, transparent or opaque, overlaid on image 302, some examples of which are described herein. For example, in FIG. 3, display 300 shows a transparent bar-shaped graphical interface element 312 along a bottom edge of image 302. One or more further graphical interface elements, in the form of text and/or graphics, may be shown in element 312. For example, in FIG. 3, a "create note" graphical selector 314 is shown in element 312. Note that image 302 of FIG. 3 is shown for illustrative purposes, and is not intended to be limiting. Depending on the particular image being captured by the camera of electronic device 104, image 302 may include views of one or more entities, such as buildings or other structures, products, streets, people, animals, trees, mountains, and/or other geographical features, natural or manmade, and virtually generated or real world.

As shown in FIG. 2, flowchart 200 begins with step 202. In step 202, content is input into a note. For example, as shown in FIG. 1, content 112 is input by user 102 into virtual note 108 in electronic device 104. Content 112 may include any amount and form of electronic content, including text, graphics (e.g., an image), video, and/or audio. Electronic device 104 may operate an editor tool that enables content 112 to be input and saved in virtual note 108. For example, electronic device 104 may operate a virtual note editing tool, such as a text editor, a conventional document editor (e.g., Microsoft® Word), a design software tool (e.g., Adobe® Photoshop®), or a special purpose virtual note editing tool, which enables content 112 to be received and saved. Virtual note 108 may be saved in the form of any type of data structure, including as one or more electronic files.

Examples of text for content 112 that may be entered into virtual note 108 include a note title, a message body, one or more links (e.g., uniform resource locator (URL) addresses), and/or any other suitable textual content. Examples image for content 112 that may entered into virtual note 108 includes an image/photo of user 102, and/or any other images of any suitable format (e.g., a GIF, JPG, or other image file format). Video files (e.g., in an MPEG format) and/or audio files (e.g., WAV, MP3, or other format) may also be entered into virtual note 108.

In an embodiment, electronic device 104 may store one or more virtual note templates. A virtual note template may be selected by user 102 in which to enter content 112 for virtual note 108. Alternatively, user 102 may enter content 112 into a "blank" virtual note 108, or may edit a prior-created virtual note to generate virtual note 108.

Figure 4:
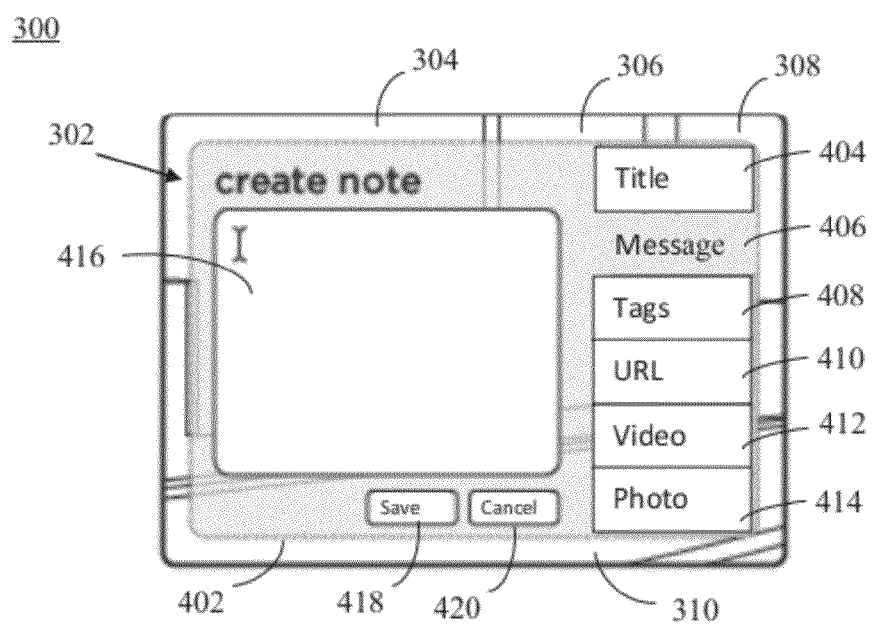

FIG. 4 shows display 300 of FIG. 3 displaying image 302 with a graphical user interface (GUI) window 402 overlaid thereon. In the example of FIG. 4, GUI window 402 is transparent, although in alternative embodiments, may be opaque. GUI window 402 is a "note creator" template interface configured to enable users to input content 112 into virtual note 108. In an embodiment, GUI window 402 is opened after user 102 selects create note selector 314 shown in FIG. 3 to begin generating virtual note 108. As shown in FIG. 4, GUI window 402 includes a text entry portion 416, and a column of content type selectors, including a title selector 404, a message selector 406, a tags selector 408, a URL selector 410, a video selector 412, and a photo selector 414. Furthermore, GUI window 402 includes a save selector 418 and a cancel selector 420. Selectors 404-414, 418, and 420 (and further "selectors" described elsewhere herein) are shown as graphical buttons, but may have any other suitable graphical interface form, as would be known to persons skilled in the relevant art(s).

When a user selects title selector 404, GUI window 402 provides a title entry portion in which user 102 can input a title for virtual note 108. When a user selects message selector 406, GUI window 402 provides text entry portion 416 in which user 102 can input a message body for virtual note 108. When a user selects tags selector 408, GUI window 402 provides a mechanism by which user 102 can input tags for virtual note 108. For example, an interface may be provided to enable user 102 to associate tags with objects visible in image 302. When a user selects URL selector 410, GUI window 402 provides an URL entry portion in which user 102 can input one or more URLs for virtual note 108. When a user selects video selector 412, GUI window 402 provides an entry portion in which user 102 can input/attach one or more video files for virtual note 108. When a user selects photo selector 414, GUI window 402 provides a photo entry portion in which user 102 can input/attach one or more images for virtual note 108. When a user selects save selector 418, content 112 entered into virtual note 108 through GUI window 402 is saved (e.g., in the form of a file or other data structure). When a user selects cancel selector 420, GUI window 402 is closed, and any content entered into virtual note 108 through GUI window 402 is not saved.

Referring back to flowchart 200, in step 204, at least one attribute associated with the note is configured. Step 204 is optional. Any one or more attributes associated with the note may be configured, including access permissions, an expiration date, metadata associated with an area associated with the note, and alert attributes.

For example, FIG. 5 shows display 300 of FIG. 3 displaying image 302 with a GUI window 502 overlaid thereon. In the example of FIG. 5, GUI window 502 is transparent, although in alternative embodiments, may be opaque. GUI window 502 is a "viewing setting" interface configured to enable users to configure access settings for virtual note 108. In an embodiment, GUI window 502 is opened automatically after selecting save selector 418 in GUI window 402 shown in FIG. 4. As shown in FIG. 5, GUI window 502 includes a column of group selectors, including a family group selector 504, a friends group selector 506, a relatives group selector 508, and a create group selector 510. Furthermore, GUI window 502 includes a contacts list portion 512, a place selector 514, and a cancel selector 516.

Contacts list portion 512 lists one or more contacts 518 of user 102 (e.g., persons known to or otherwise associated with user 102 for communications purposes). Contacts 518 may be identified in contacts list portion 512 in any manner, including by name, an email address, text message ID, or any other type of identifier. In GUI window 502, user 102 may select one or more contacts 518 in contacts list portion 512, and then select (e.g., click on) one of family group selector 504, a friends group selector 506, a relatives group selector 508, and a create group selector 510 to provide the corresponding access level setting to the selected one or more contacts 518. For example, by selecting family selector 504, user 102 may assign the selected one or more contacts 518 "family" level access privileges for viewing, adding comments, and/or deleting virtual note 108. By selecting friends selector 506, user 102 may assign the selected one or more contacts 518 "friends" level access privileges for viewing, adding comments, and/or deleting virtual note 108. By selecting relatives selector 508, user 102 may assign the selected one or more contacts 518 "relatives" level access privileges for viewing, adding comments, and/or deleting virtual note 108. The level of access for "family," "friends," and "relatives" may be preset by user 102 by interacting with GUI window 502, including any combination of read privileges (e.g., being enabled to see and read virtual note 108) and write privileges (e.g., being enabled to add a comment to virtual note 108, to delete virtual note 108, etc.). For example, user 102 may select create group selector 510 to form a new group (e.g., business, a common interest group, etc.), to assign the new group with particular access privileges, and may provide the new group with a label. The new group may thereafter have a selector, similar to selector 504, 506, and 508, which appears on GUI window 502, and that may be used to assign access level settings to selected contacts 518.

When a user selects place selector 514, the assigned access level settings are saved, and user 102 is enabled to position virtual note 108, as described below. When a user selects cancel selector 516, GUI window 502 is closed, and any settings entered into virtual note 108 through GUI window 502 are not saved.

Although not shown in FIG. 5, GUI window 502, or one or more further GUI windows, may enable user 102 to configure further settings. For example, user 102 may be enabled to designate an expiration date for virtual note 108. User 102 may be enabled to assign metadata data to the area associated with virtual note 108 (e.g., billboard 304, first building 306, second building 308, street 310, etc., displayed by display 300). The metadata may include any one or more of labels, tags, description, meta-tags, text, links (e.g., URLs), etc. In another example, user 102 may be enabled to set a notification attribute indicating whether user 102 is to receive an alert when virtual note 108 is viewed or edited. User 102 may be enabled to configure the alert type based on a second user that views virtual note 108 (e.g., depending on whether the second user is included in the "family," "friends," "relatives," or other group).

Referring back to flowchart 200 (FIG. 2), in step 206, a virtual representation of the note is positioned in a virtual space superimposed on an entity. As indicated in FIG. 1, a virtual representation of virtual note 108 is generated that may be positioned in a virtual space 110 superimposed on entity 106. For example, FIG. 6 shows display 300 of FIG. 3 displaying image 302 with a virtual representation 602 of virtual note 108 overlaid thereon. In FIG. 6, display 300 shows a virtual representation 602 in an "adjust note" mode. In the example of FIG. 6, virtual representation 602 is transparent, although in alternative embodiments, may be opaque. Virtual representation 602 is a virtual object that represents virtual note 108 in a virtual space (e.g., virtual space 110 of FIG. 1) overlaid on the region shown in image 302. In an embodiment, virtual representation 602 is generated and displayed in display 300 after selecting place selector 514 in GUI window 502 shown in FIG. 5. Virtual representation 602 may include a portion of content 112 (e.g., a title of virtual note 108, an identifier for user 102, all or a portion of the message, etc.) or may include all of content 112, in a manner to visually identify virtual note 108 in display 300.

Electronic device 104 may provide an interface (e.g., keyboard, arrow keys, flywheel, etc.) to enable user 102 to modify a position of virtual representation 300 in the virtual space overlaid on the region shown in image 302. For example, user 102 may use his/her hands/fingers to adjust the position of virtual representation 300 in a virtual manner in the three-dimensional space visible in display 300. In another example, as shown in FIG. 6, display 300 may display a GUI that enables the positioning of virtual representation 300. As shown in FIG. 6, display 300 shows a transparent bar-shaped graphical interface element 604 along a bottom edge of image 302. Element 604 includes a plurality of GUI elements that enable positioning of virtual representation 300, including a backward positioning element 606, a forward positioning element 608, a leftward positioning element 610, a rightward positioning element 612, a counterclockwise rotational element 614, and a clockwise rotational element 616. User 102 may interact with backward positioning element 606 to move virtual representation 602 backward in the virtual space shown in display 300, and with forward positioning element 608 to move virtual representation 602 forward in the virtual space shown in display 300. User 102 may interact with leftward positioning element 610 to move virtual representation 602 leftward in the virtual space shown in display 300, and with rightward positioning element 612 to move virtual representation 602 rightward in the virtual space shown in display 300. User 102 may interact with counterclockwise rotational element 614 to rotate virtual representation 602 counterclockwise (as indicated in FIG. 6) in the virtual space shown in display 300, and with clockwise rotational element 616 to rotate virtual representation 602 clockwise in the virtual space shown in display 300.

Note that in an embodiment, while in "adjust note" mode, a position of virtual representation 602 may be further adjusted by moving electronic device 104 to adjust a direction of the camera of electronic device 104. For example, if the camera is pointed upward relative to the view shown in FIG. 6, virtual representation 602 may be moved upward (e.g., to "post" virtual note 108 higher up on a building, on a treetop, on the sky, etc.). If the camera is pointed downward relative to the view shown in FIG. 6, virtual representation 602 may be moved downward (e.g., to "post" virtual note 108 on the ground, on a floor, etc.). Likewise, the camera may be panned left or right relative to the view shown in FIG. 6 to move virtual representation 602 left or right, respectively, and/or user 102 move electronic device 102 in any direction to move virtual representation 602 in that direction. Furthermore, in an embodiment, a "snap to" function may be enabled in "adjust note" mode. When the "snap to" function is enabled, virtual representation 602 may "snap" (e.g., be positioned by electronic device 104) to a surface or edge of a real world object (e.g., billboard 304, building 306, building 308, etc.) shown in display 300. Such a "snap to" function is an example of an automatic positioning function that may be enabled by electronic device 104.

FIG. 7 shows display 300 of FIG. 3 displaying image 302 with the position of virtual representation 602 modified relative to the (initial) position of virtual representation 602 shown in FIG. 6. By interacting with the positioning elements in element 604, virtual representation 602 has been moved into a position in the virtual space such that virtual representation 602 appears to be mounted to billboard 304. Thus, in the example of FIG. 7, virtual representation 602 may be considered to be superimposed on an entity such as billboard 304 or the geographical location of billboard 304. In embodiments, virtual representation 602 may be superimposed on any entity, including an object (e.g., billboard 304, building 306, building 308, street 310, etc.), a geographical location, a living being such as a human or animal, or any other entity that may be shown in image 302. The position of virtual representation 602 shown in FIG. 7 is provided for illustrative purposes, and in embodiments, user 102 may move virtual representation 602 anywhere in the virtual space overlaid on image 302 as desired.

Note that in the example of FIG. 7, virtual representation 602 is shown as having a three-dimensional rectangular shape. In alternative embodiments, as described in further detail below, virtual representation 602 may have other shape. In embodiments, virtual representation 602 may have a standard shape (e.g., rectangular as in FIG. 7), or may have a selectable and/or configurable shape. For instance, graphical interface element 604 (or any other user interface provided by electronic device 104) may provide a pull-down menu or other interface element that enables a shape of virtual representation 602 to be selected (e.g., from a list). Alternatively, one or more interface elements may be provided that enable user 102 to create or modify the shape of virtual representation 602, or to load a shape (e.g., load a file containing shape information) for virtual representation 602.

In step 208, the virtual representation of the note is associated with the entity. In an embodiment, virtual representation 602 may be associated with the entity that virtual representation 602 is superimposed upon. As shown in FIG. 6, element 604 may further include a lock selector 618 and a cancel selector 620. When a user selects lock selector 514, the current association of virtual representation 602 is locked, and virtual note 108 is complete. In this case, an indication of the entity with which virtual representation 602 is associated, and the orientation of virtual representation 602 (e.g., the orientation of virtual representation 602 in the three-dimensions) is saved in virtual note 108. For instance, if virtual representation 602 is associated with a geographical location, the geographical location is saved in virtual note 108. If virtual representation 602 is associated with a fixed object, the geographical location (and optionally an identifier for the fixed object) is saved in virtual note 108. If virtual representation 602 is associated with a mobile object or living being, an identifier for the mobile object or living being is saved in virtual note 108. The geographical location of the mobile object or living being may also be saved in virtual note 108. As described further below, the geographical location of a mobile entity may be periodically updated in order to track the mobile entity.

Virtual note 108 may be transmitted to be stored in a virtual notes database for subsequent access. When virtual note 108 is subsequently interacted with to cause virtual representation 602 to be viewed, virtual representation 602 will appear having the locked association and orientation. When a user selects cancel selector 516, virtual representation 602 is deleted from display 300, and virtual note 108 may be canceled (or the process for generating virtual note 108 may return to a prior stage, such as step 202 or step 204 described above).

For instance, FIG. 8 shows virtual representation 602 after user 102 has locked its association (e.g., by selecting lock selector 618). As shown in FIG. 8, virtual representation 602 is locked in the position (e.g., geographical location and orientation) in which virtual representation 602 was placed in FIG. 7. Furthermore, in FIG. 8, after locking virtual representation 602, display 300 has returned to the mode of FIG. 3, where create note selector 314 is present. User 102 may select create note selector 314 to generate a second virtual note 108, if desired.

In an embodiment, the entity with which virtual representation 602 is locked is associated with virtual note 108 (as indicated by dotted arrow 116 shown in FIG. 1). In this manner, subsequent interactions with that entity will enable users (having suitable access privileges) to interact with virtual note 108. Furthermore, when such users cause virtual representation 602 to be viewed, virtual representation 602 will appear in the position of the entity, in the orientation set by user 102. The association of an entity with virtual note 108 may be performed in various ways. For example, in an embodiment (as described in further detail below), electronic device 102 may be GPS (global positioning system) enabled to determine a location and heading of electronic device 102 to associate with virtual note 108 when virtual note 108 is generated. Alternatively, in another example, user 102 may select the entity on a map or otherwise provide coordinates (e.g., latitude and longitude) to be associated with virtual note 108 (as also described in further detail below).

A geographical location may be defined in any manner, including a specific coordinate system, such as latitude/longitude, using the WGS 84 geodetic datum, or a local system specific to a particular region and/or country.

Note that in one embodiment (as described above), in step 208, virtual note 108 may be associated by a user with the particular entity viewed in display 300. In another embodiment, in step 208, virtual note 108 may be associated by the user with a plurality of entities. For example, the user may associate virtual note 108 with an entity viewed in display 300, and may further be provided with an option to associate virtual note 108 with additional entities related to the viewed entity. Such related entities may be related businesses (e.g., some or all businesses in a chain of businesses, such as a chain of restaurants, shops, stores, etc.), related people, related objects, etc. In one example, a user may associate virtual note 108 with a Starbucks store in Sunnyvale, Calif. (e.g., virtual note 108 may be generated to recommend a new Starbucks beverage). The user may desire to further associate virtual note 108 with additional Starbucks stores in Northern California. Electronic device 102 (e.g., a user interface) may enable the user to select further Starbucks stores individually, to select groups of Starbucks stores based on region, or to select all Starbucks stores, to have virtual note 108 associated with each them.

II. Example Embodiments for Interacting with Virtual Notes

Figure 9:
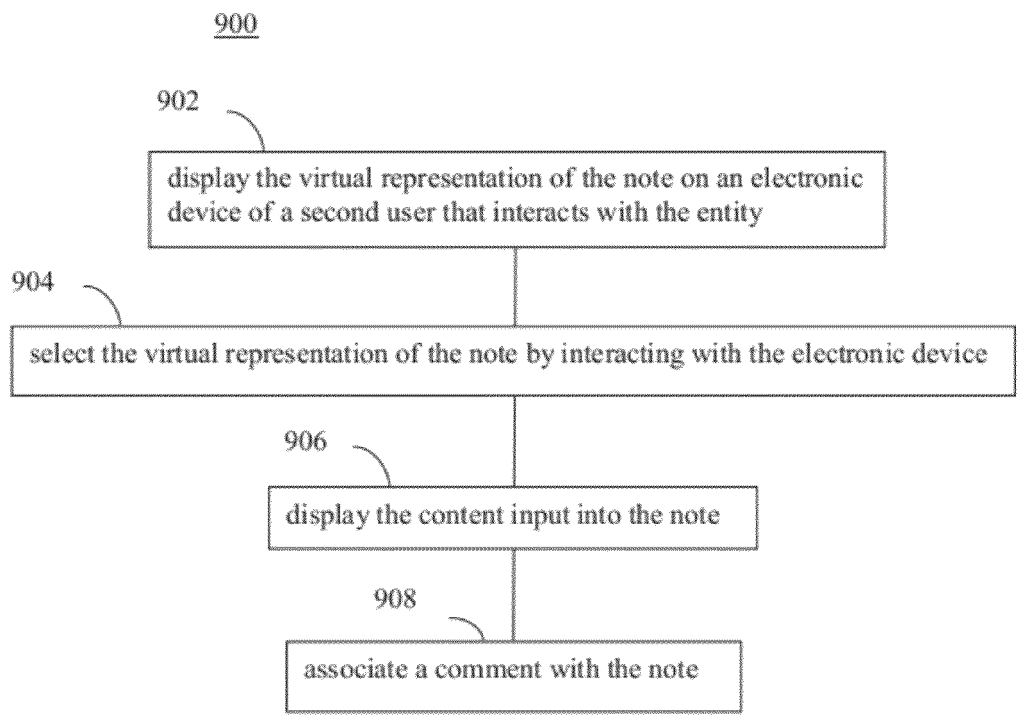
FIG. 9 shows a flowchart for interacting with a virtual note, according to an example embodiment of the present invention.
Figure 10:
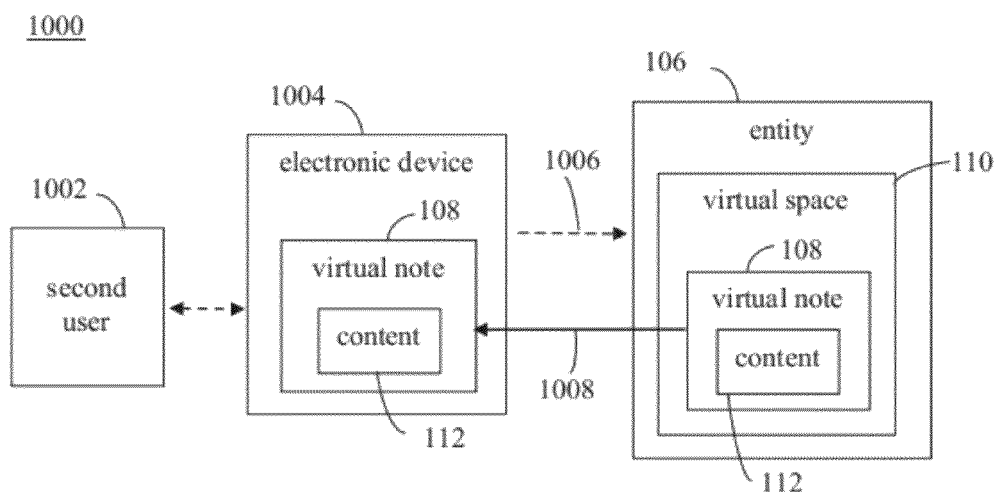
FIGS. 10 and 13 show block diagrams of a system for interacting with a virtual note, according to an example embodiment of the present invention.

As described above, users may interact with virtual notes that are associated with entities. FIG. 9 shows a flowchart 900 for interacting with a virtual note, according to an example embodiment of the present invention. Flowchart 900 may be performed by a subsequent user, for example. For instance, FIG. 10 shows a block diagram of a system 1000 for interacting with virtual note 108, according to an example embodiment of the present invention. As shown in FIG. 10, a second user 1002 interacts with an electronic device 1004 to interact with virtual note 108. Electronic device 1004 may be any type of electronic device, including those described above for electronic device 104. Further structural and operational embodiments will be apparent to persons skilled in the relevant art(s) based on the discussion regarding flowchart 900. Not all steps shown in FIG. 9 for flowchart 900 need be performed in all embodiments of flowchart 900. Flowchart 900 is described as follows with respect to system 1000, and with respect to FIGS. 11, 12, 14, and 15, which show various views of a display of electronic device 1004, for illustrative purposes.

As shown in FIG. 9, flowchart 900 begins with step 902. In step 902, the virtual representation of the note is displayed on an electronic device of a second user that interacts with the entity. As described above, and shown in FIG. 10, virtual note 108 is associated with entity 106. Second user 1002 interacts with electronic device 1004 to interact with entity 106, as indicated by dotted arrow 1006 in FIG. 10. In embodiments, second user 1002 may interact with entity 106 in various ways. For example, and as described in further detail further below, in an embodiment, second user 1002 may interact with entity 106 by viewing and/or selecting entity 106 on a map, or by entering map coordinates for entity 106. In another embodiment, second user 1002 may interact with entity 106 by entering a region that is proximate to entity 106 (e.g., moving to within a predetermined distance of entity 106), or by entity 106 entering a region proximate to second user 1002 (if entity 106 is mobile). In any case, due to the interaction with entity 106 (assuming any access attributes associated with virtual note 108 allow for it), a display of electronic device 1004 may display virtual representation 602 of virtual note 108.

Figure 11:
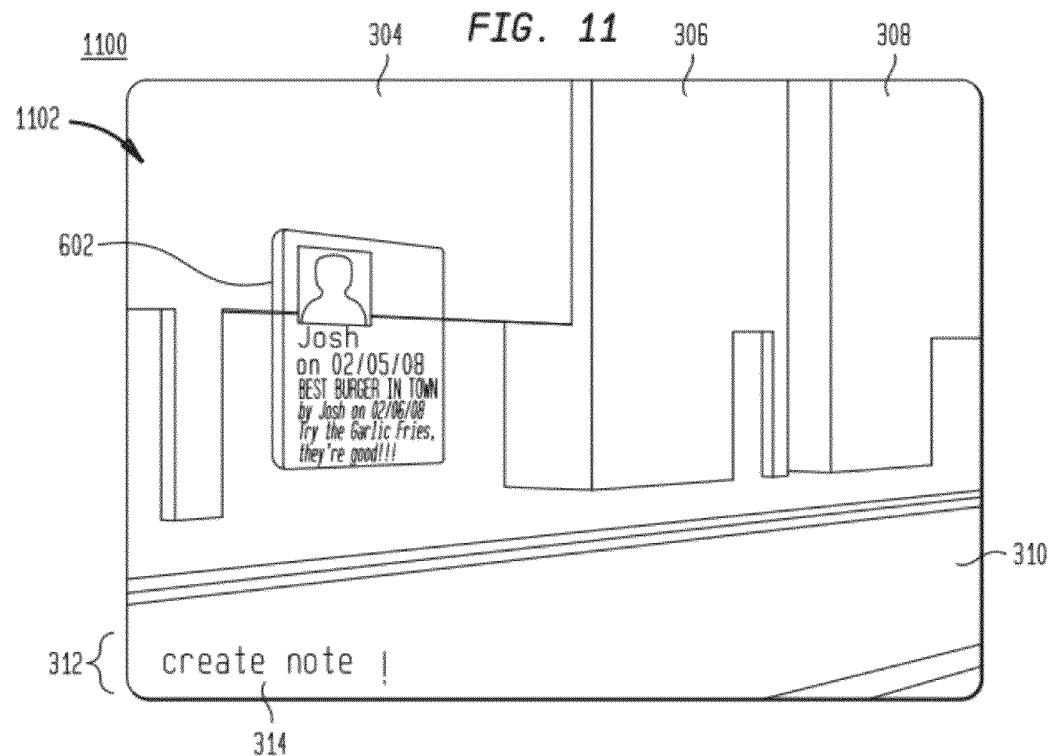

For instance, FIG. 11 shows a display 1100, which is an example display device for electronic device 1004, and shows an image 1102 displayed by display 1100. In an embodiment, electronic device 1004 includes a camera that captures image 1102 displayed by display 1100. Display 1100 may have any suitable size, and be any type of display device, including those described above with respect to display 300 shown in FIG. 3. As shown in FIG. 11, display 1100 shows virtual representation 602 in a virtual space superimposed on a region similar to the region of image 302 shown in FIG. 3. Image 1102 is similar to image 302 because the camera of electronic device 1004 is positioned in a similar position, and pointed in a same direction as was the camera of electronic device 104 when capturing image 302. Image 1102 is shown similar to image 302 for ease of illustration. However, it is intended to be understood that the camera of electronic device 1004 may be positioned differently from the camera of electronic device 104, and thus may view virtual representation 602 from a different perspective (e.g., virtual representation 602 may have a different orientation than shown in FIG. 11 if viewed from a different location by electronic device 1004).

Note that in an embodiment, in order for virtual representation 602 to be visible in image 1102, the camera of electronic device 1004 must be pointed toward the position of virtual representation 602 at entity 106, and must be sufficiently close to entity 106 to resolve virtual representation 602. Furthermore, as described above, a portion of content 112 (as shown in FIG. 11) or all of content 112 of virtual note 108 may be visible in virtual representation 602.

In step 904, the virtual representation of the note is selected by interacting with the electronic device. Second user 1002 may select virtual representation 602 displayed in display 1100 if second user 1002 desires to interact with virtual note 108. Second user 1002 may select virtual representation 602 in any suitable manner, including using a mouse, stick, or roller ball pointer to point-and-click, using arrow keys, a wheel (e.g., a thumb wheel), a keyboard, a touch screen, a haptic interface, virtual gestural functions, an eye recognition system, voice recognition, a detected brain impulse, etc. For example, second user 1002 may maneuver a mouse pointer over virtual representation 602 in display 1100, and then click on a mouse button, to select virtual representation 602.

In step 906, the content input into the note is displayed. As shown in FIG. 10, by interacting with entity 106, and selecting virtual representation 602, virtual note 108 is transmitted to electronic device 1004 (e.g., from a notes server, as described in further detail below) as indicated by arrow 1008 shown in FIG. 10. Virtual note 108 is received by electronic device 1004. Electronic device 1004 displays and otherwise enables second user 1002 to interact with virtual note 1008. For example, electronic device 1004 may include a virtual note editor and/or viewer, similar to electronic device 104 described above, to interact with virtual note 108.

Figure 12:
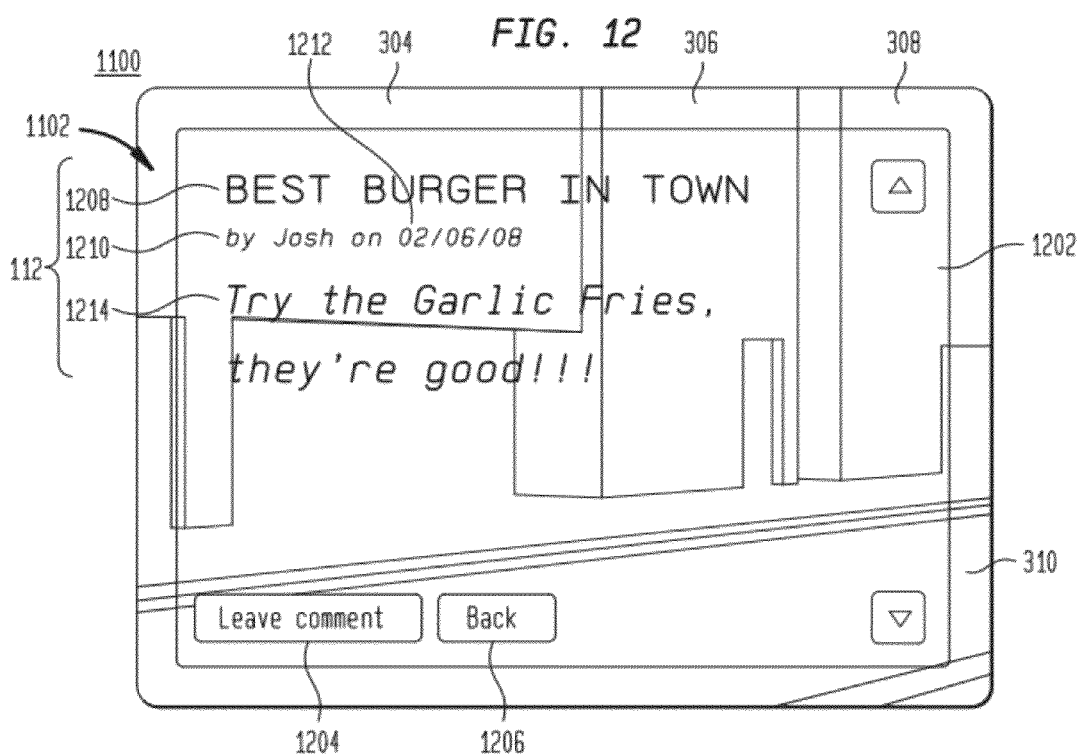

For instance, FIG. 12 shows display 1100 of FIG. 11 displaying image 1102 with a GUI window 1202 overlaid thereon. In the example of FIG. 12, GUI window 1202 is transparent, although in alternative embodiments, may be opaque. GUI window 1202 displays content 112 of virtual note 108. In an embodiment, GUI window 1102 is opened after second user 1002 selects virtual representation 602 shown in FIG. 11. In the example of FIG. 12, content 112 includes a title 1208, "Best Burger in Town," an identifier 1210 for user 102 "Josh," a creation date 1212, "on 02/06/08," and a message body 1214, "Try the Garlic Fries, they're good!!!!" Second user 1002 can read this content provided by content 112, and any additional content that may be provided by content 112, including one or more images, videos, audio, links, etc.

As shown in FIG. 12, GUI window 1202 further includes a leave comment selector 1204 and a back selector 1206. When a user selects leave comment selector 1204, the user is enabled to provide a comment to attach to virtual note 108 (e.g., as described as follows with respect to step 908). A user may select back selector 1206 when finished interacting with virtual note 108. In such case, GUI window 1202 may close, and display 1100 may revert to the display provided in FIG. 11.

Figure 13:
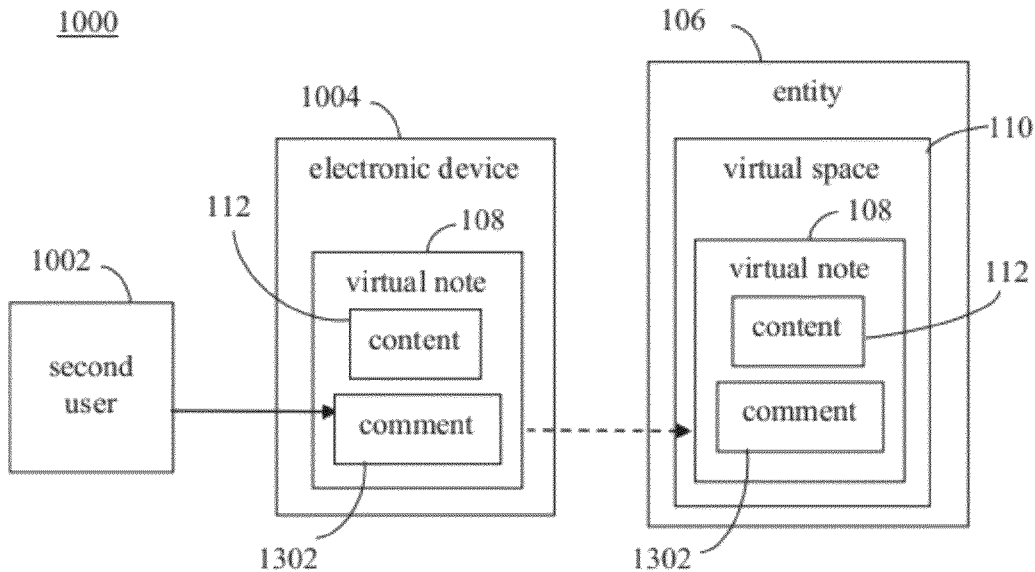
Figure 14:
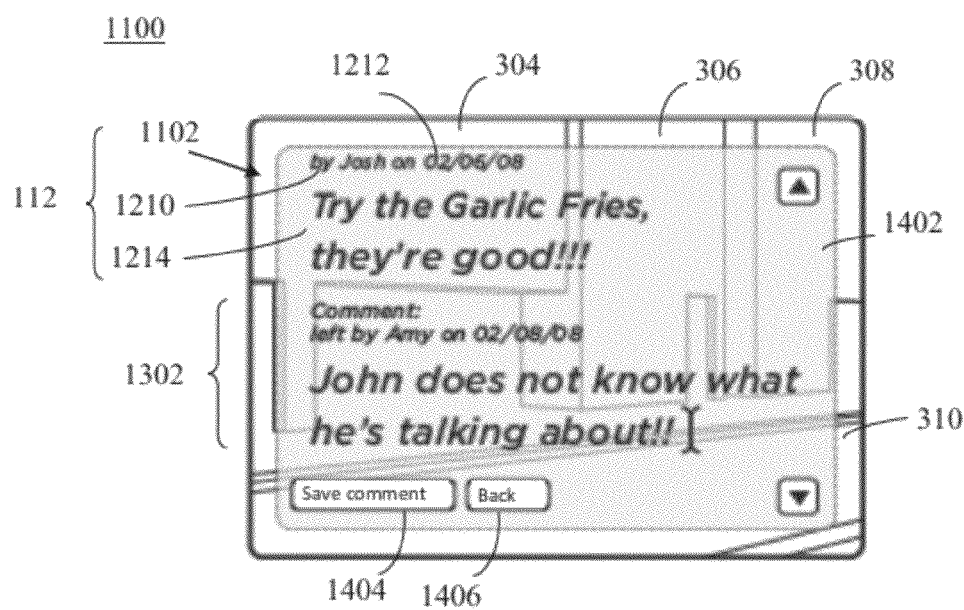

In step 908, a comment is associated with the note. For instance, FIG. 13 shows system 1000 of FIG. 10, where second user 1002 has input a comment 1302 into virtual note 108. Second user 1002 may input comment 1302 into virtual note 108 in a variety of ways. For example, FIG. 14 shows display 1100 of FIG. 11 displaying image 1102 with a GUI window 1402 overlaid thereon. In the example of FIG. 14, GUI window 1402 is transparent, although in alternative embodiments, may be opaque. GUI window 1402 displays content 112 of virtual note 108 and enables second user 1002 to include comment 1302. For example, GUI window 1402 may provide virtual note editor functionality, as described above, to enable second user 1002 to input comment 1302 into virtual note 108. In an embodiment, GUI window 1402 is opened after second user 1002 selects leave comment selector 1204 shown in FIG. 12. In the example of FIG. 14, comment 1302 entered by second user 1002 includes an identifier for user 1002 "Amy," a creation date, "on 02/08/08," and a message body, "John does not know what he's talking about!!"

Second user 1002 may provide the comment content shown in FIG. 14, and/or any alternative and/or additional comment content including any text, one or more images, videos, audio, links, etc.

In an embodiment, a rating may be applied by second user 1002 as a comment. For instance, second user 1002 may rate content 112 entered by user 102 and/or may rate comments provided by other users regarding virtual note 108. In the example of FIG. 14, user 1002 may provide a rating indicating whether user 1002 agrees that the garlic fries are good. A rating may be provided in any manner and/or according to any rating system, including according to a star rating system (e.g., having a maximum of five stars), a numerical rating system, a textual rating system, and/or any further rating system.

Figure 15:
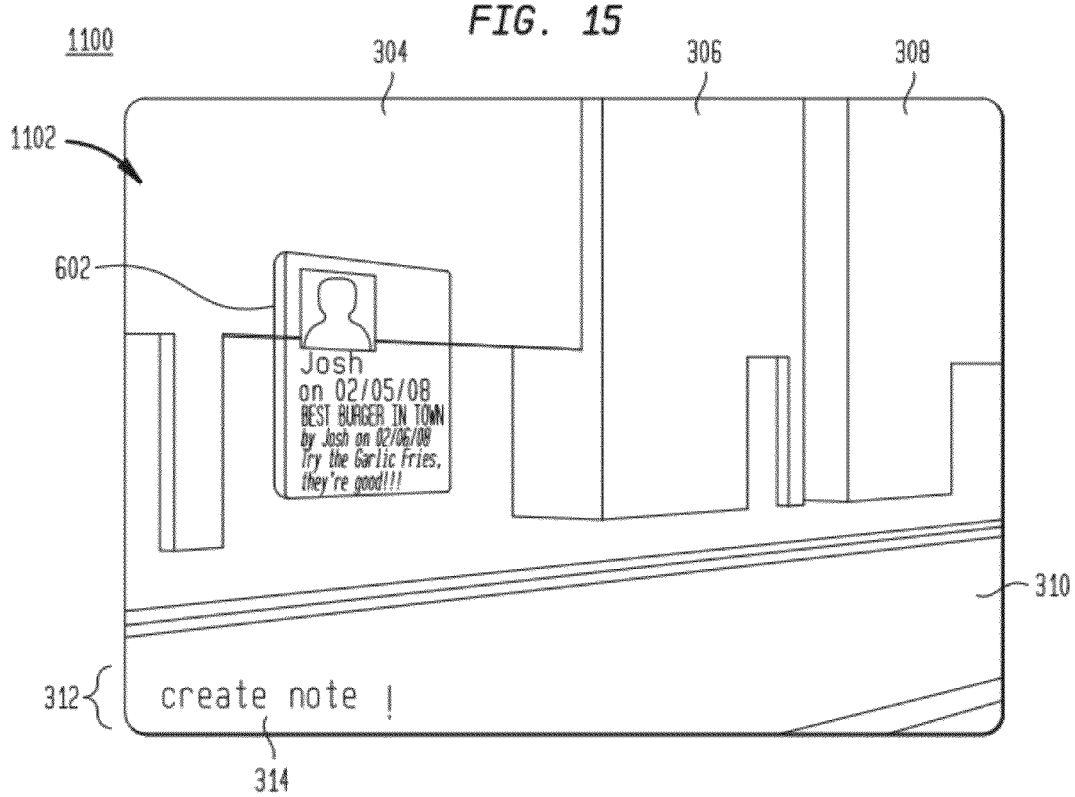

As shown in FIG. 12, GUI window 1402 further includes a save comment selector 1404 and a back selector 1206. When a user selects save comment selector 1404, comment 1302 is saved and associated with virtual note 108, which is associated with entity 106. Virtual note 108, with comment 1302, may be transmitted from electronic device 1004 to be stored in a virtual notes database for subsequent access, for instance. FIG. 15 shows an example of display 1100 after comment 1302 is saved. As shown in FIG. 15, image 1102 is shown, and virtual representation 602 is displayed superimposed on the region. As shown in FIG. 14, a user may select back selector 1406 to return to GUI window 1202 of FIG. 12 without saving comment 1302.

A subsequent user may interact with virtual note 108 to view content 112 and comment 1302 associated with virtual note 108. For example, FIG. 16 shows a flowchart 1600 for interacting with a virtual note, according to an example embodiment of the present invention. Flowchart 1600 may be performed by a subsequent user, for example, such as a third user, or user 102 shown in FIG. 1. For instance, FIG. 17 shows a block diagram of a system 1700 for interacting with virtual note 108, according to an example embodiment of the present invention. As shown in FIG. 17, a third user 1702 interacts with an electronic device 1704 to interact with virtual note 108. Electronic device 1704 may be any type of electronic device, including those described above for electronic device 104. Further structural and operational embodiments will be apparent to persons skilled in the relevant art(s) based on the discussion regarding flowchart 1600. Flowchart 1600 is described as follows with respect to system 1700, and with respect to FIG. 18, which shows a view of a display of electronic device 1704, for illustrative purposes.

As shown in FIG. 16, flowchart 1600 begins with step 1602. In step 1602, the virtual representation of the note is displayed on an electronic device of a third user that interacts with the entity. As described above, and shown in FIG. 17, virtual note 108 is associated with entity 106. Third user 1702 interacts with electronic device 1704 to interact with entity 106, as indicated by dotted arrow 1706 in FIG. 17. Third user 1702 may interact with entity 106 by entering region that is proximate to entity 106 (or by viewing or selecting entity 106 on a map), or by entity 106 entering a region proximate to third user 1702. Due to the interaction with entity 106 (assuming any access attributes associated with virtual note 108 allow for it), a display of electronic device 1704 may display virtual representation 602 of virtual note 108 (such as shown in FIG. 15 for electronic device 1004 of second user 1002).

In step 1604, the virtual representation of the note is selected by interacting with the electronic device. In a similar manner as described above with respect to step 904 (FIG. 9), third user 1702 may select virtual representation 602 displayed in a display of electronic device 1704 if third user 1702 desires to interact with virtual note 108.

In step 1606, the content input into the note and the associated comment are displayed. As shown in FIG. 17, by interacting with entity 106, and selecting virtual representation 602, virtual note 108 is transmitted to electronic device 1704 (e.g., from a notes server, as described in further detail below) as indicated by arrow 1708 shown in FIG. 17. Virtual note 108 is received by electronic device 1704. Electronic device 1704 displays and otherwise enables third user 1702 to interact with virtual note 1008. For example, electronic device 1704 may include a virtual note editor and/or viewer, similar to electronic device 104 described above, to interact with content 112 of virtual note 108.

For instance, FIG. 18 shows a display 1800 of electronic device 1704 displaying an image 1802 with a GUI window 1804 overlaid thereon. In the example of FIG. 18, GUI window 1804 is transparent, although in alternative embodiments, may be opaque. GUI window 1804 displays content 112 of virtual note 108. In an embodiment, GUI window 1804 is opened after third user 1702 selects virtual representation 602. In the example of FIG. 18, GUI window 1804 displays content 112 described above that was entered by user 102 (e.g., identifier 1210 for user 102 "Josh," creation date 1212, "on 02/06/08," and message body 1214, "Try the Garlic Fries, they're good!!!!") and comment 1302 entered by second user 1002 (an identifier for user 1002 "Amy," a creation date, "02/08/08," and a message body, "John does not know what he's talking about!!"). Third user 1702 can read content 112 and comment 1302, and may optionally provide a second comment for virtual note 108.

As shown in FIG. 18, GUI window 1202 further includes a leave comment selector 1806 and a back selector 1808. When a user selects leave comment selector 1806, the user is enabled to add a comment to virtual note 108, as described above with respect to step 908 of flowchart 900 (FIG. 9). A user may select back selector 1808 when finished interacting with virtual note 108. In such case, GUI window 1804 may close, and display 1800 may revert to the display provided in FIG. 15.

III. Example Map-Based Virtual Note Generation and Interaction

As described above, a user may interact with entity 106 by entering a region that is proximate to entity 106 (e.g., moving to within a predetermined distance of entity 106), or by entity 106 entering a region proximate to the user. In another embodiment, a user may interact with entity 106 by viewing and/or selecting entity 106 on a map. Example map-based interactions with entity 106 are described in this section. Such map-based interactions may be used to associate a newly generated virtual note 108 with entity 106 (e.g., step 206 of flowchart 200 in FIG. 2), and/or to interact with an existing virtual note 108 that was previously associated with entity 106 (e.g., steps 902-908 of flowchart 900 shown in FIG. 9).

For instance, FIG. 19 shows a display 1900 of an electronic device displaying a map 1902. Map 1902 is a map of a region that may show any combination of geographical and navigational features, including roads, parks, buildings, golf courses, rivers, lakes, etc. Map 1902 may be generated in various ways. For example, a number of interactive Internet-based mapping portals are available to generate maps such as map 1902, including Yahoo!® Maps, MapQuest, and Google™ Maps. As shown in FIG. 19, display 1900 further shows several GUI features overlaid on map 1902, including bar-shaped graphical interface element 312 (that includes create note selector 314), a note filter GUI element 1904, first-fifth virtual note indicators 1906, 1908, 1910, 1912, and 1914, and a user location indicator 1916.

First-fifth virtual note indicators 1906, 1908, 1910, 1912, and 1914 are graphical indicators that each indicates a corresponding virtual note and the location of the entity associated with the virtual note. If an entity associated with a virtual note is a mobile entity, the location of the entity may be tracked in any suitable manner, so that a virtual note indicator may be positioned on map 1902 at a current location of the mobile entity. For instance, one or more of image recognition, audio recognition, video recognition, optical character recognition, sensor technology (e.g., radio frequency identification (RFID)), may be used to determine the location of an entity. A network identification number, such as a Bluetooth unique ID, an IP address, or other network ID may be detected to determine a location of an entity. The entity may transmit a location signal (similar to a location signal transmitted by an electronic device, as described below with regard to FIG. 23) that includes a location of the entity determined according to GPS (global positioning system) technology (e.g., in terms of longitude and latitude, or other location indication system). In another embodiment, data may be mined from the Internet to determine the location of an entity. The map generator for map 1902 may determine or receive the location of an entity according to any one or more of these techniques, and may indicate the determined/received location on map 1902 using a virtual note indicator.

Each of first-fifth virtual note indicators 1906, 1908, 1910, 1912, and 1914 is displayed as a callout that includes a title of the corresponding virtual note, and includes a pointer that indicates the entity associated with the virtual note on map 1902. For example, first virtual note indicator 1906 is a graphical indicator for the example of virtual note 108 described above, with the virtual note title "Best Burger in Town" displayed on map 1902.

Note filter GUI element 1904 is configured to enable a user to filter the display of virtual notes indicators on map 1902. Note filter GUI element 1904 may be configured in any manner, including as a pull down list (as shown in FIG. 19), a fill-in blank, etc. The user interacts with note filter GUI element 1904 to select the particular filter, and executes the filter, to filter the display of virtual note indicators on map 1902. Note filter GUI element 1904 may be configured to filter the display of virtual notes indicators on map 1902 according to any virtual note attribute. For example, in an embodiment, note filter GUI element 1904 may be configured to enable the user to filter virtual note indicators according to assigned group, such as by showing on map 1902 only virtual notes indicated as members of family," "friends," "relatives," or other selected group (e.g., as described above with respect to FIG. 5). Virtual note indicators displayed on map 1902 may be filtered according to any attribute, including by assigned group, by metadata, by keyword searches of virtual note content, and/or any other attribute. Further examples of information that may be used to filter display of virtual note indicators are described further below.

A user may be enabled to select one of virtual note indicators 1906, 1908, 1910, 1912, and 1914 to view content 112 (including any comments 1302) of the corresponding virtual note 108. Furthermore, the user may be enabled to view the virtual representation of the corresponding virtual note 108. The user may select a virtual note indicator in map 1902 in any manner described elsewhere herein, or otherwise known, including by pointing and clicking using a mouse pointer. For instance, FIG. 20 shows display 1900 displaying a GUI window 2002. GUI window 2002 displays content 112 of virtual note 108 associated with virtual note indicator 1906 shown in FIG. 19. In an embodiment, GUI window 2002 is opened after a user selects virtual note indicator 1906 in map 1902. The user can view content 112 as desired. As shown in FIG. 20, GUI window 2002 further includes a leave comment selector 2004, a read next note selector 2006, and a back-to-map selector 2008. When a user selects leave comment selector 2004, the user is enabled to provide a comment to attach to virtual note 108 (e.g., as described above with respect to step 908 in FIG. 9). When the user selects read next note selector 2006, a next virtual note associated with a virtual note indicator in map 1902 may be displayed in GUI window 2002. In this manner, the user can move directly from virtual note to virtual note indicated in map 1902 without having to return to map 1902 each time. A user may select back-to-map selector 2008 to return to map 1902 when finished interacting with virtual notes.

User location indicator 1916 shown on map 1902 in FIG. 19 indicates a location of the user of the electronic device (of display 1900). As described elsewhere herein, the location of the user may be determined in various ways, including through GPS techniques and/or any other location determining technique described elsewhere herein or otherwise known. The user of the electronic device may desire to generate a virtual note (e.g., according to steps 202 and 204 of flowchart 200 in FIG. 2), and to associate the generated virtual note with an entity (e.g., step 206 of flowchart 200) that is displayed in map 1902. For example, the user may associate the generated virtual note with the location of the user indicated in FIG. 19 by user location indicator 1916, with another location on map 1902, or with a map feature (e.g., a road, lake, golf course, etc.) displayed on map 1902.

For example, FIG. 21 shows an example of display 1900 displaying map 1902 as shown in FIG. 19, with the addition of virtual note indicators 2102 and 2104. Virtual note indicators 2102 and 2104 indicate locations in map 1902 associated with a first virtual note ("My note 01") and a second virtual note ("My note 02") generated by the user associated with user location indicator 1916. With regard to the first virtual note indicated by virtual note indicator 2102, as indicated in map 1902, the user associated the first virtual note with a location 2106, which is a location of the user. For example, a location determining device (e.g., a GPS device) of the user may have been used to determine location 2106 to associate with the first virtual note. With regard to the second virtual note indicated by virtual note indicator 2104, as indicated in map 1902, the user associated the second virtual note with a location 2108 in map 1902 that is not the same as location 2106 of the user. For example, the user may have selected location 2108 on map 1902 in any manner (e.g., by pointing and clicking) to associate location 2108 with the second virtual note.

IV. Example Embodiments for a Virtual Notes Communication System

As described above, generated virtual notes 108 may be stored in a database for subsequent access by users. Virtual notes 108 may be stored and accessed in various ways. For example, FIG. 22 shows a block diagram of a virtual notes communication system 2200, according to an embodiment of the present invention. As shown in FIG. 22, system 2200 includes a plurality of electronic devices 2202, a network 2204, a server 2206, and a notes database 2208. These elements of system 2200 are described as follows.

As shown in FIG. 22, server 2206 includes a notes engine 2210. Server 2206 is communicatively coupled with electronic devices 2202 through network 2204. Network 2204 may be a LAN, a WAN, or combination of networks, such as the Internet. Server 2206 may be one or more servers configured to communicate over network 2204. Notes engine 2210 is configured to receive newly generated virtual notes 108 and modified virtual notes 108 (e.g., with comments 1302) from electronic devices 2202, and to store received virtual notes 108 in notes database 2208. Furthermore, notes engine 2210 is configured to access virtual notes 108 stored in notes database 2208, to optionally filter the accessed virtual notes 108, and to transmit the accessed virtual notes 108 to electronic devices 2202. As shown in FIG. 22, server 2206 is communicatively coupled to notes database 2208 by a communication interface 2230. As shown in the example of FIG. 22, notes database 2208 stores virtual notes 108a-108n. Any number of virtual notes 108 may be stored in notes database 2208, including thousands, millions, or even larger numbers of virtual notes 108. Each of virtual notes 108a-108n respectively includes a corresponding one of content 112a-112n. Furthermore, although not shown in FIG. 22, each virtual note 108 may include one or more comments 1302.

Electronic devices 2202 are examples of electronic devices 104, 1004, and 1704 described above. Four example devices are shown as electronic devices 2202 in FIG. 22, for purposes of illustration. Electronic devices 2202 may include hundreds, thousands, or even millions of electronic devices. Example electronic devices 2202 include a desktop computer 2212, a mobile computing device 2214, a mobile phone 2216, and a wearable reality overlay device 2218. Desktop computer 2212 may be any type of stationary computer mentioned herein or otherwise known, including a personal computer. Mobile computing device 2214 may be any type of mobile computing device, including a mobile computer (e.g., a Palm® device, a personal digital assistant (PDA), a laptop computer, a notebook computer, etc.) or mobile email device (e.g., a RIM Blackberry® device). Mobile phone 2216 may be any type of mobile phone, including a cell phone and/or smart phone. Wearable reality overlay device 2218 may be a camera and display-enabled pair of glasses/goggles, or other wearable reality overlay device such as an electronic device embedded in the user, configured to generate a display on the lenses of the glasses/goggles, or directly on the retinas of the glasses/goggles wearer. An example of wearable reality overlay device 2218 is described in co-pending U.S. patent application Ser. No. 12/125,877, titled "Reality Overlay Device," filed on May 22, 2008, which is incorporated by reference herein in its entirety. Electronic devices 2202 may include any number and type of devices that users may use to generate and interact with virtual notes 108, including or alternative to the example electronic devices shown in FIG. 22.

Each electronic device may communicate with server 2206 through a corresponding communication link. For example, as shown in FIG. 22, desktop computer 2212 is communicatively coupled with network 2204 through a first communication interface 2220, mobile computing device 416 is communicatively coupled with network 2204 through a second communication interface 2222, mobile phone 2216 is communicatively coupled with network 2204 through a third communication interface 2224, and wearable reality overlay device 2218 is communicatively coupled with network 2204 through a fourth communication interface 2226. Server 2206 is shown communicatively coupled with network 2204 through a fifth communication interface 2228. First-fifth communication interfaces 2220, 2222, 2224, 2226, and 2228 may include any type or combination of communication links, including wired and/or wireless links, such as IEEE 802.11 wireless LAN (WLAN) wireless links, cellular network links, wireless personal area network (PAN) links (e.g., Bluetooth™ links), Ethernet links, USB links, etc.

Example embodiments for electronic devices 2202 and for notes engine 2210 are described in the following subsections.

A. Example Electronic Device Embodiments

In embodiments, an electronic device (e.g., electronic devices 104, 1004, 1704, and/or any of electronic devices 2202) may be implemented in hardware, software, firmware, or any combination thereof, including having the form of hardware logic, and/or software/firmware that executes in one or more processors. For instance, FIG. 23 shows a block diagram of an electronic device 2300, according to an example embodiment of the present invention. In an embodiment, any of electronic devices 104, 1004, 1704, and electronic devices 2202 may be configured as electronic device 2300. Electronic device 2300 is configured to enable a user to generate a virtual note, and to interact with generated virtual notes. For instance, in embodiments, electronic device 2300 may be configured to enable each of the processes shown in flowcharts 200 (FIG. 2), 900 (FIG. 9), and 1600 (FIG. 16). Enablement of these processes by electronic device 2300 is described as follows. Electronic device 2300 is provided for illustrative purposes, and is not intended to be limiting.

As shown in FIG. 23, electronic device 2300 includes a user interface 2302, a note processing module 2304, a location determiner 2306, a camera 2308, a communication interface 2310, a rendering module 2320, and storage 2350.

Camera 2308 is an image capturing device. For example, camera 2308 may include an array of photoelectric light sensors, such as a charge coupled device (CCD) or a CMOS (complementary metal-oxide-semiconductor) sensor device. Camera 2308 is used to capture images (e.g., still images and/or video) for electronic device 2300. For example, camera 2308 may capture image 302 shown in FIG. 3, image 1102 shown in FIG. 11, or image 1802 shown in FIG. 18. Camera 2308 may be mounted to electronic device 2300 in any fashion. For example, camera 2308 may be an external web cam, a camera embedded in electronic device 2300, a camera mounted in glasses (e.g., for wearable reality overlay device 2218), etc. Camera 2308 generates an image data signal 2332. In an embodiment, electronic device 2300 may include multiple cameras 2308. For example, wearable reality overlay device 2218 shown in FIG. 22 may include a pair of cameras 2308 to enable virtual spaces to be overlaid on each the pair of display lenses of device 2218 to provide a stereoscopic view to the user.

Location determiner 2306 is configured to determine a location of electronic device 2300. Furthermore, in an embodiment, location determiner 2306 may be configured to determine a direction/heading of electronic device 2300 (e.g., a direction in which camera 2308 is pointed). Location determiner 2306 may be configured to determine location and/or direction information for electronic device 2306 in a variety of ways. For example, in an embodiment, location determiner 2306 may include a GPS module 2324. GPS module 2324 is configured to determine location information according to GPS techniques. For example, GPS module 2324 may include a GPS receiver configured to receive signals from four or more GPS satellites, and to determine a position and heading of electronic device 2300 using trilateration. Trilateration and further techniques for determining location and direction information, such as triangulation, are well known to persons skilled in the relevant art(s). Location determiner 2306 generates a determined location signal 2330 that includes an indication of a location and direction of electronic device 2300. Determined location signal 2330 may indicate location in any manner, including according to a specific coordinate system, such as latitude/longitude, using the WGS 84 geodetic datum, or a local system specific to a particular region and/or country. Determined location signal 2330 may indicate direction in any suitable manner, including according to a compass heading, etc.

User interface 2302 enables a user to interact with electronic device 2300, including generating and interacting with virtual notes 108 using electronic device 2300. User interface 2302 includes any number and combination of user interface elements, such as a keyboard, a thumb wheel, a mouse pointer, a roller ball, a stick pointer, a display 2312, any number of virtual interface elements (e.g., such as a keyboard or other user interface element displayed by display 2312), a voice recognition system, and/or other user interface elements described elsewhere herein or otherwise known. In another embodiment, user interface 2302 includes a haptic interface configured to interface electronic device 1300 with the user by the sense of touch, by applying forces, vibrations and/or motions to the user. For example, the user of electronic device 1300 may wear a glove or other prosthesis to provide the haptic contact.

For instance, FIG. 24 shows an example of user interface 2302, where a user of electronic device 2300 is enabled to physically interact with a virtual representation of a virtual note. As shown in FIG. 24, display 2312 of electronic device 2300 displays an image 2402 that is similar to image 1102 shown in FIG. 11, with the addition of a captured image of a hand 2404 of the user of electronic device 2300. In the example of FIG. 24, hand 2404 of the user is reaching out in front of camera 2308 to select virtual representation 602. By properly placing/moving a finger 2406 into a virtual position in the virtual space that is occupied by virtual representation 602, the user is able to select virtual representation 602 to view content 112 of virtual note 108. In a similar manner, the user may be enabled by user interface 2302 to enter content 112 and/or comments 1320 into a virtual note 108 (e.g., using a virtual keyboard), and/or to otherwise interact with virtual notes in a virtual fashion.

User interface 2302 is configured to enable a user to input content 112 into a virtual note 108 as described above (e.g., with respect to flowchart 200 of FIG. 2), to input a comment 1302 as described above (e.g., with respect to flowchart 900 of FIG. 9), and to interact with generated virtual notes 108, as described above. For example, user interface 2302 may include display by display 2312 of a GUI 2314, which may include display of any of the GUI windows described above or elsewhere herein.

Note processing module 2304 is coupled to user interface 1302, location determiner 2306, camera 2308, communication interface 2310, rendering module 2320, and storage 2350. Note processing module 2304 is configured to perform processing of virtual notes, including enabling virtual notes to be generated, and to enable interactions with virtual notes. For instance, note processing module 2304 is configured to receive content 112 (and comments 1320) entered at user interface 2302 in a received content signal 2328, to generate a virtual note 108 that includes the received content 112, and to associate an entity with the virtual note 108, such as a geographical location, object, or living being. In an embodiment where the entity is a geographical location, note processing module 2304 may associate the entity with a location indicated in determined location signal 2306 (or selected on a map, such a map 1902, displayed by display 2312 with the virtual note 108). As shown in FIG. 23, note processing module 2304 may include an editor module 2316 configured as a virtual note editing tool that can receive content 112, comments 1302, and can package them into a virtual note 108.

FIG. 25 shows a block diagram of a virtual note 2500 that may be generated by note processing module 2304, according to an example embodiment of the present invention. Virtual note 2500 is an example of virtual note 108. As shown in FIG. 25, virtual note 2500 includes note content 112, note attributes 2506, note position information 2508, and may optionally include note appearance information 2510. Each of these elements of virtual note 2500 is described as follows.

As described elsewhere herein, content 112 may include any of one or more types of content, such as text, graphics (e.g., images), video, audio, links, metadata, etc. Note attributes 2506 may include any of one or more types of attributes associated with virtual note 2500, such as the attributes described above with respect to step 204 of flowchart 200 (FIG. 2). For example, note attributes 2506 may include one or more access groups and/or further information that may be used to filter access to virtual note 2500 (e.g., metadata, labels, tags, meta-tags, text, links, etc.), alert settings, an expiration date, and/or further attributes.

In an embodiment, note position information 2508 may include a geographical location associated with virtual note 2500 (e.g., as determined by location determiner 2306 or selected on a map). Note position information 2508 may indicate whether the entity associated with virtual note 2500 is a fixed position entity or a mobile entity. If the entity is a mobile entity, note position information 2508 may be continually updated (e.g., by notes engine 2210, as described in further detail below). Note appearance information 2510 may be present to define a shape of a virtual representation (e.g., virtual representation 602 shown in FIG. 6) of virtual note 2500, in an embodiment where virtual representations of virtual notes may be varied from virtual note to virtual note. For instance, in the examples shown above, virtual representation 602 shown in FIG. 6 is displayed as planar, and in FIG. 7 is shown as having a three-dimensional rectangular shape. In alternative embodiments, a virtual representation of a virtual note may have other shapes, including any two-dimensional or three-dimensional shape, such as being round, spherical, triangular, pyramidal, any other two-dimensional or three-dimensional polygon, shaped as an object or person, or having any other shape, regular or irregular. As described above, in an embodiment, a shape of a virtual representation may be selected (e.g., from a list of shapes) or may be configured (e.g., shaped) by interacting with user interface 2302 shown in FIG. 23.

Rendering module 2320 is configured to generate a virtual representation (e.g., virtual representation 602) of a virtual note to be displayed by display 2312 in a virtual space superimposed on the entity. Rendering module 2320 may generate the virtual representation based on note appearance information 2510. Rendering module 2320 may be configured to generate the virtual representation according to any suitable rendering techniques that will be known to persons skilled in the relevant art(s). Rendering module 2320 may render a two-dimensional or three-dimensional virtual representation of a virtual note to include perspective, shading, shadows, texture-mapping, transparency or opacity, reflections, and/or any other image rendering effects. In an embodiment, rendering module 2320 receives note appearance information 2510 from note processing module 2304 for a particular virtual note, and generates a rendered image signal 2326, which is received by display 2312. Alternatively, rendering module 2320 may generate rendered image signal 2326 based on a standard (e.g., rectangular) shape for a virtual note. Display 2312 displays a virtual representation of the virtual note according to rendered image signal 2326.

Communication interface 2310 is configured to enable communications over a communication link 2318 for electronic device 2300, such that communication signals may be received from and transmitted over a network (e.g., network 2204 shown in FIG. 22). For example, communication interface 2310 may enable communications with server 2206. A generated (or edited) virtual note may be transmitted from note processing module 2304 to communication interface 2310 as virtual note signal 2334. Communication interface 2310 may receive virtual note signal 2334, and transmit virtual note signal 2334 to server 2206, to be stored in notes database 2208. Furthermore, communication interface 2310 may receive one or more virtual notes from server 2206 in a received virtual notes signal 2336. Received virtual notes 2336 is transmitted from communication interface 2310 to note processing module 2304 so that note processing module 2304 can enable the received virtual notes to be viewed (at display 2312), to be edited with comments (at user interface 2302), to be deleted, etc., according to the access settings applied to each received virtual note.

Furthermore, in an embodiment, note processing module 2304 may provide location information received from location determiner 2306 in determined location signal 2330 to communication interface 2310 to transmit to notes engine 2210, so that notes engine 2210 may ascertain a location of electronic device 2300.

In embodiments, rendering engine 2320, notes processing module 2304, and editor module 2316 may be implemented in hardware, software, firmware, or any combination thereof. For example, rendering engine 2320, notes processing module 2304, and/or editor module 2316 may be implemented in hardware logic, and/or may include software/firmware that executes in one or more processors of one or more computer systems, such as one or more servers.

Communication interface 2310 may be configured to enable communications over any type or combination of communication links, including wired and/or wireless links, such as IEEE 802.11 wireless LAN (WLAN) wireless links, cellular network links, wireless personal area network (PAN) links (e.g., Bluetooth™ links), Ethernet links, USB links, etc.

Storage 2350 enables one or more virtual notes to be stored in electronic device 2300. Such virtual notes may be stored in the form of the information shown in FIG. 25 for virtual note 2500, or may be stored in other form. Note processing module 2304 may store generated virtual notes in storage 2350 and/or may store virtual notes received through communication interface 2310 in storage 2350. Storage 2350 may include one or more storage devices used to store virtual notes 108, including one or more hard disc drives, optical disc drives, memory devices (e.g., random access memory (RAM) devices), etc.

B. Example Notes Engine Embodiments

In embodiments, notes engine 2210 may be implemented in hardware, software, firmware, or any combination thereof. For example, notes engine 2210 may be implemented in hardware logic, and/or may include software/firmware that executes in one or more processors of one or more computer systems, such as one or more servers (e.g., server 2206). Notes database 2208 may be any database and/or data structure capable of storing virtual notes 108. Notes database 2208 may include one or more storage devices used to store virtual notes 108, including one or more hard disc drives, optical disc drives, memory devices (e.g., random access memory (RAM) devices), etc.

For example, FIG. 26 shows a block diagram of server 2206, notes engine 2210, and notes database 2208, according to an example embodiment of the present invention. As shown in FIG. 26, server 2206 includes a communication interface 2602 and notes engine 2210. Notes engine 2210 includes a location comparator 2604 and a notes manager 2606. FIG. 26 is described with respect to FIGS. 27 and 28, which respectively show flowcharts 2700 and 2800. Further structural and operational embodiments will be apparent to persons skilled in the relevant art(s) based on the discussion regarding flowcharts 2700 and 2800.

Flowchart 2700 shown in FIG. 27 provides an example process for storing virtual notes that may be performed by notes engine 2210. Referring to flowchart 2700, in step 2702, a note transmitted from an electronic device is received. For example, as shown in FIG. 26, server 2206 may receive virtual note signal 2334 transmitted by an electronic device, such as electronic device 2300 shown in FIG. 23. As shown in FIG. 27, virtual note signal 2334 may be received by communication interface 2602. Similarly to communication interface 2310 shown in FIG. 23, communication interface 2602 is configured to enable communications over communication link 2228 for electronic server 2206, such that communication signals may be received from and transmitted over a network (e.g., network 2204 shown in FIG. 22). Communication interface 2602 may be configured in any suitable manner, including as described above for communication interface 2310 shown in FIG. 23.

In step 2704, the received note is stored in a notes database. For example, notes engine 2210 may receive the virtual note in virtual note signal 2334 from communication interface 2602. In an embodiment, notes manager 2606 is configured to interact with notes database 2208 to store virtual notes in notes database 2208, and to request virtual notes from notes database 2208. In the current example, notes manager 2606 may store the virtual note received in virtual note signal 2334 in notes database 2208. As shown in FIG. 26, notes database 2208 stores virtual notes 2500a-2500n. Each of virtual notes 2500a-2500n includes a corresponding one of content 112a-112n and of position information 2508a-2508n. Although not shown in FIG. 26, for purposes of brevity, each of virtual notes 2500a-2500n may include further information, including note attributes 2506 and/or note appearance information 2510 shown in FIG. 25.

In an embodiment, flowchart 2700 may include the further steps of receiving and storing updated location information for the received note. As described above, entity 106 shown in FIG. 1 may be a mobile entity. In such a situation, the location of the mobile entity may be tracked by notes engine 2210 so that it can be determined whether a user interacts with the mobile entity (e.g., by the mobile entity and user being separated by a distance that is less than a predetermined threshold distance). In an embodiment, the mobile entity may be configured to include a location determining mechanism, and a communication mechanism for transmitting a determined location for the mobile entity to notes engine 2210. For instance, the mobile entity may include location determiner 2306 (to determine a location of the mobile entity) and communication interface 2310 (to transmit the determined location to notes engine 2210) shown in FIG. 23 for electronic device 2300. Alternatively, other techniques may be used to determine the location of the mobile entity, such as image, audio, video, and/or optical character recognition systems that determine the location of the mobile entity, a sensor technology (e.g., radio frequency identification (RFID)) that determines the location of the mobile entity, a network that tracks the location of the mobile entity by a network identification number, such as a Bluetooth unique ID, an IP address, or other network ID, or data mining performed on Internet data to determine the location of the mobile entity.

As shown in FIG. 26, communication interface 2602 of server 2206 may receive a location indication signal 2616 from a mobile entity or from other location determining source configured to determine a location of the mobile entity. Location indication signal 2616 indicates an updated location of the mobile entity. Location indication signal 2616 may be received periodically, or according to any other regular or irregular interval. Notes manager 2606 of notes engine 2210 may receive the updated location contained in location indication signal 2616, and may store the updated location in position information 2508 for any virtual notes 2500 in notes database 2208 associated with the mobile entity.

Flowchart 2800 shown in FIG. 28 provides an example process for enabling electronic devices to interact with virtual notes that may be performed by notes engine 2210. Referring to flowchart 2800, in step 2802, an interaction of a user with an entity is detected. For example, as described above, electronic device 2300 shown in FIG. 23 may transmit a determined location of electronic device 2300 to notes engine 2210. A determined location of electronic device 2300 may be transmitted from electronic device 2300 in a periodic manner or any other suitable manner, such that notes engine 2210 may track movement of electronic device 2300. Notes engine 2210 receives the determined location of electronic device 2210, and uses the determined location to determine any interactions with virtual notes 2500a-2500n in notes database 2208 (in step 2804 below).

In step 2804, one or more notes associated with the entity is/are determined. For example, location comparator 2604 may receive the determined location of electronic device 2210. Location comparator 2604 is configured to compare the determined location of electronic device 2300 with position information 2508a-2508n associated with virtual notes 2500a-2500n stored in notes database 2208. If the received determined location is sufficiently proximate to the position of one or more of the virtual notes 2500a-2500n, as indicated in position information 2508a-2508n, notes engine 2210 is configured to indicate the corresponding one or more of virtual notes 2500a-2500n for viewing by electronic device 2300.

For example, FIG. 29 shows an environment 2900 in which a user 2902 may move with electronic device 2300. For example, electronic device 2300 may be a cell phone, a mobile computer, a wearable reality overlay device, etc., carried by user 2902. Location comparator 2604 in FIG. 26 may be configured to determine any of virtual notes 2500a-2500n associated with an entity within a predetermined distance from electronic device 2300 (e.g., as indicated in position information 2508). For instance, in the example of FIG. 29, the predetermined distance may be a radius 2908 of circle that defines a region 2906 centered at electronic device 2300. Region 2906 moves with electronic device 2300. Location comparator 2604 determines any virtual notes 2500a-2500n associated with an entity that falls within region 2906 at any particular time. Note that in an alternative embodiment, region 2906 can have another shape, such as a rectangle, etc.

For illustrative purposes, an entity 2904 is indicated in FIG. 29 which is associated with a virtual note, such as virtual note 2500a in notes database 2208. Entity 2904 may be a geographical location, an object, a living being (e.g., a human, an animal, etc.) or other entity. Electronic device 2300 may transmit a first location indication signal 2910 when located in the center of region 2906a. As shown in FIG. 29, region 2906a does not contain any entities associated with virtual notes. Thus, in region 2906a, location comparator 2604 does not determine any of virtual notes 2500a-2500n associated with the location of electronic device 2300.

User 2902 may move electronic device 2300 to the center of region 2906b from region 2906a. At this second location, electronic device 2300 may transmit a second location indication signal 2910 to notes engine 2210. As shown in FIG. 29, region 2906b contains entity 2904 associated with virtual note 2500b. Location comparator 2604 compares the location of electronic device 2300 received in second location indication signal 2910 to the entities corresponding to virtual notes 2500a-2500n. As a result, location comparator 2604 determines that virtual note 2500a is within region 2908 because the distance between the location of electronic device 2300 and entity 2904 associated with virtual note 2500a is less than radius 2908. Thus, electronic device 2300 and virtual note 2500a are considered to be geographically associated. It is noted that any number of further ones of virtual notes 2500a-2500n may also be associated with entities in region 2906b, including entity 2904 or other entity, and thus may also be determined to be associated with the location of electronic device 2300 by location comparator 2604.

As shown in FIG. 26, in an embodiment, notes manager 2606 may include a notes filter 2608. Notes filter 2608 is configured to filter the one or more of virtual notes 2500a-2500n associated with entities determined by location comparator 2604 to be interacted with by electronic device 2300. Notes filter 2608 may analyze attribute information (e.g., note attributes 2506 of FIG. 25) of virtual notes 2500 to determine one or more of them that may be transmitted to electronic device 2300 and/or one or more of virtual notes 2500 that may be filtered out.

In step 2806, an alert signal is transmitted to an electronic device of the user to indicate the one or more notes associated with the entity. For example, referring back to FIG. 26, notes engine 2210 (through communication interface 2602) may transmit an alert signal 2610 to electronic device 2300 to indicate the one or more of virtual notes 2500a-2500n that were determined by location comparator 2604 to be associated with entities interacted with by electronic device 2300. Alert signal 2610 is received by electronic device 2300, and a corresponding alert is provided to the user (e.g., a visual and/or audio alert by user interface 2302) by electronic device 2300.

For instance, FIG. 30 shows an example electronic device 3000 having a display 3002 that shows an alert message 3004, according to an example embodiment of the present invention. Electronic device 3000 may display alert message 3004 in response to receiving alert signal 2610 from notes engine 2210. In the example of FIG. 30, alert message 3004 includes the textual message "Your network have left 15 notes in the vicinity." For instance, with regard to alert message 3004, location comparator 2604 may have determined five of virtual notes 2500a-2500n that have entities proximate to a determined location of electronic device 3000. Alert message 3004 may have any configuration, including any configuration of text, graphics, and/or audio, to inform a user of electronic device 3000 that one or more virtual notes are nearby.

As shown in FIG. 30, display 3002 further shows a view notes selector 3006 and a cancel selector 3008. When a user selects view notes selector 3006, the user is enabled to view the indicated virtual notes. A user may select cancel selector 3008 if the user does not desire to view the indicated virtual notes. Note that in an embodiment, a user may need to login (e.g., provide a login ID and password) to be enabled to view particular virtual notes, depending on the particular access settings.

In step 2808, a request is received from the electronic device for a note. For instance, if a user of electronic device 2300 selects to view a virtual note indicated in alert signal 2610, electronic device 2300 may transmit a virtual note request signal 2612 to notes engine 2210. As shown in FIG. 26, notes engine 2210 receives virtual note request signal 2612. Any number of one or more virtual notes may be requested in virtual note request signal 2612.

In step 2810, the note is transmitted to the electronic device. In an embodiment, notes manager 2606 receives the virtual note request provided in virtual note request signal 2612. Notes manager 2606 accesses notes database 2208 for one or more of virtual notes 2500a-2500n indicated by the virtual notes request, and server 2602 transmits (using communication interface 2602) a virtual notes response signal 2614. Virtual notes response signal 2614 is received by electronic device 2300 (e.g., as received virtual notes signal 2336 shown in FIG. 23). In an embodiment, display 2312 of electronic device 2300 may display a virtual representation of one or more of the virtual notes received in virtual notes response signal 2614. Alternatively, display 2312 may display a list of the virtual notes received in virtual notes response signal 2614. For example, FIG. 31 shows a display 3100 of an electronic device that shows a user interface 3102 providing a list 3104 of received virtual notes. In an embodiment, the user of the electrical device may select a virtual note from the displayed virtual representations or from list 3106 to view the content of the virtual note.

Note that in some cases, a large number of virtual notes 108 may be displayed at the same time as virtual representations by display 2312 of electronic device 2300. In such as case, notes processing module 2304 and rendering engine 2320 (FIG. 23) may be configured to arrange the display of the virtual representations in a manner to make interacting with the virtual representations more convenient for a user. For example, the virtual representations may be arranged and displayed in a tiled arrangement, or any other suitable arrangement, for ease of viewing and interaction.

V. User Information

As described above, user attributes may be used to filter virtual notes (e.g., by notes filter 2608) to enable access (e.g., viewing access, commenting access, deleting access, etc.) to virtual notes 108 for some users, while denying access to other users. For example, a variety of user attributes may be used to filter virtual notes, including any combination of time of day/week/year (temporal data), location (spatial data), relationships between users (social data), and topical data. Each user may include various types and amounts of information. User information for each user may be actively provided by a user, collected from each user, provided from some other network, system or database that aggregates such data, or by any combination of the foregoing. For example, FIG. 32 shows a block diagram of user information 3200 that may be associated with users that access virtual notes (e.g., using system 2200 shown in FIG. 22). User information 3200 shown in FIG. 32 may be included in a file or other data structure. Each element of user information 3200 shown in FIG. 32 may be one or more data fields, data records, or other type of data entry in a data structure. Access to virtual notes 108 may be filtered based on any one or more of the types and/or elements of user information 3200 described below.

As shown in FIG. 32, user information 3200 includes spatial data 3202, temporal data 3204, social data 3206 and topical data 3208. Each of the elements of user information 3200 shown in FIG. 32 is not necessarily present in all embodiments. The elements of user information 3200 shown in FIG. 32 are described as follows.

Spatial data 3202 may be any information associated with a location of a user and/or an electronic device associated with the user. For example, spatial data 3202 may include any passively-collected location data, such as cell tower data, GPRS data, global positioning service (GPS) data, WI-FI data, personal area network data, IP address data and data from other network access points, or actively-collected location data, such as location data entered into a device by a user. Spatial data 3202 may be obtained by tracking the path and state of an electronic device associated with the user.

Temporal data 3204 is time-based data (e.g., time stamps) or metadata (e.g., expiration dates) that relates to specific times and/or events associated with a user and/or an electronic device associated with the user. For example, temporal data 3204 may include passively-collected time data (e.g., time data from a clock resident on an electronic device, or time data from a network clock), or actively-collected time data, such as time data entered by the user of the electronic device (e.g., a user-maintained calendar).

Social data 3206 may be any data or metadata relating to the relationships of a user of an electronic device. For example, social data 3206 may include user identity data, such as gender, age, race, name, an alias, a status of the user (e.g., an online status or a non-online related status) (e.g., at work, at sleep, on vacation, etc.), a social security number, image information (such as a filename for a picture, avatar, or other image representative of the user), and/or other information associated with the user's identity. User identity information may also include e-mail addresses, login names and passwords. Social data 3206 may also include social network data. Social network data may include data relating to any relation of the user of the electronic device that is input by a user, such as data relating to a user's friends, family, co-workers, business relations, and the like. Social network data may include, for example, data corresponding with a user-maintained electronic address book. Certain social data may be correlated with, for example, location information to deduce social network data, such as primary relationships (e.g., user-spouse, user-children and user-parent relationships) or other relationships (e.g., user-friends, user-co-worker, user-business associate relationships) and may be weighted by primacy.

For example, as shown in FIG. 32, social data 3206 may include relationship information 3214. Relationship information 3214 includes a list or other data structure indicating friends of the user, including friends that are other users 108 participating in social network 102. Relationship information 3214 may include categories for the indicated friends, such as "relatives," "spouse," "parents," "children," "cousins," "best friends," "boss," "co-workers," and/or any other suitable category.

Social data 3206 may further include reputation information regarding the user. For example, other users 108 may be able to comment on and/or provide a rating for the user. An overall rating may be determined for the user, which may represent a reputation for the user.

Topical data 3208 may be any data or metadata concerning subject matter in which a user of an electronic device appears to have an interest or is otherwise associated. Topical data 3208 may be actively provided by a user or may be derived from other sources. For example, topical data 3208 may include one or more transaction log(s) 3204 of transactions involving the user. For example, transaction log(s) 3204 may include logs of searches (e.g., query lists/results lists) performed by the user, logs of commerce undertaken by the user, logs of website/webpage browsing by the user, logs of communications (e.g., with friends in social network 102) by the user, etc.

Both social data 3206 and topical data 3208 may be derived from interaction data. As used herein, the term interaction data refers to any data associated with interactions carried out by a user via an electronic device, whether active or passive. Examples of interaction data include interpersonal communication data, media data, transaction data and device interaction data.

Interpersonal communication data may be any data or metadata that is received from or sent by an electronic device and that is intended as a communication to or from the user. For example, interpersonal communication data may include any data associated with an incoming or outgoing SMS message, e-mail message, voice call (e.g., a cell phone call, a voice over IP call), or other type of interpersonal communication relative to an electronic device, such as information regarding who is sending and receiving the interpersonal communication(s). As described below, interpersonal communication data may be correlated with, for example, temporal data to deduce information regarding frequency of communications, including concentrated communication patterns, which may indicate user activity information.

Media data may be any data or metadata relating to presentable media, such as audio data, visual data and audiovisual data. Audio data may be, for example, data relating to downloaded music, such as genre, artist, album and the like, and may include data regarding ringtones, ring backs, media purchased, playlists, and media shared, to name a few. Visual data may be data relating to images and/or text received by an electronic device (e.g., via the Internet or other network). Visual data may include data relating to images and/or text sent from and/or captured at an electronic device. Audiovisual data may include data or metadata associated with any videos captured at, downloaded to, or otherwise associated with an electronic device.

Media data may also include media presented to a user via a network, such as via the Internet, data relating to text entered and/or received by a user using the network (e.g., search terms), and data relating to interaction with the network media, such as click data (e.g., advertisement banner clicks, bookmarks, click patterns and the like). Thus, media data may include data relating to a user's RSS feeds, subscriptions, group memberships, game services, alerts, and the like. Media data may also include non-network activity, such as image capture and/or video capture using an electronic device, such as a mobile phone. Image data may include metadata added by a user, or other data associated with an image, such as, with respect to photos, location at which the photos were taken, direction of the shot, content of the shot, and time of day, to name a few. As described in further detail below, media data may be used for example, to deduce activities information or preferences information, such as cultural and/or buying preferences information.

Interaction data may also include transactional data or metadata. Transactional data may be any data associated with commercial transactions undertaken by a user via an electronic device, such as vendor information, financial institution information (e.g., bank information), financial account information (e.g., credit card information), merchandise information and cost/prices information, and purchase frequency information, to name a few. Transactional data may be utilized, for example, to deduce activities and preferences information. Transactional information may also be used to deduce types of devices and/or services owned by a user and/or in which a user may have an interest.

Interaction data may also include device interaction data and metadata. Device interaction data may be any data relating to a user's interaction with an electronic device not included in any of the above categories, such as data relating to habitual patterns associated with use of an electronic device. Example of device interaction data include data regarding which applications are used on an electronic system/device and how often and when those applications are used. As described in further detail below, device interaction data may be correlated with temporal data to deduce information regarding user activities and patterns associated therewith.

User information 3200 may also include deduced information. The deduced information may be deduced based on one or more of spatial data 3202, temporal data 3204, social data 3206, or topical data 3208 as described above. The deduced information may thus include information relating to deduced locations and/or deduced activities of the user. For example, the deduced information may comprise one or more of a primary user location, secondary user location, past locations, present location, and predicted future location information. The deduced information may include information deduced based on a correlation of spatial data 3202 in conjunction with temporal data 3204 to deduce such location data. By way of illustration, spatial data 3202 may be correlated with temporal data 3204 to determine that a user of an electronic device is often at one or more specific locations during certain hours of the day. In a particular embodiment, spatial data 3202 is correlated with temporal data 3204 to determine a primary user location (e.g., home), a secondary location (e.g., school or work) and/or other locations, as well as a cyclical model for a user's spatial/temporal patterns.

The deduced information may also include activity information, such as past activity information, present activity information, and predicted future activity information. In this regard, the past, present, or predicted future activity information may include information relating to past communications and/or co-locations with other users. By way of example, spatial data 3202 may be correlated with temporal data 3204 to determine a user's activities (e.g., work, recreation and/or home activities).

The deduced information may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user. All preferences may be explicitly provided by a user or implicitly derived from aggregated user and network data.

VI. Monetization

Note that advertisements may be displayed that are associated with virtual note 108. For example, referring to FIG. 8, a virtual advertisement may be displayed on or adjacent to virtual representation 602 by display 300. Furthermore, an advertisement may be displayed when viewing content 112 of virtual note 108, such as in GUI window 1202 shown in FIG. 12 or GUI window 1804 shown in FIG. 18. In another embodiment, an advertisement may be displayed on or adjacent to a map (e.g., map 1902 of FIG. 19) that is associated with a virtual note indicator shown on the map.

In embodiments, advertisers may pay money and/or provide compensation for display of advertisements associated with virtual notes. For instance, advertisers may be enabled to bid for space on or adjacent to virtual notes. Users may be enabled to configure their electronic devices to view or not view such advertisements. Advertisers may be enabled to sponsor virtual notes. For example, a user "Ana" may generate a significant number of virtual notes related to a job, interest, or hobby, such as snowboarding. By analyzing metadata associated with Ana's virtual notes, it may be determined that snowboarding is a hobby of Ana's. In such case, a vendor that provides a product or service related to her hobby (e.g., snowboarding), may desire to sponsor Ana's virtual notes. In this example, a snowboard manufacture/vendor may desire to provide advertisements associated with Ana's virtual notes.

In an embodiment, network and system operators may be enabled to charge the advertisers for providing the advertisers' advertisements with virtual notes. In another embodiment, virtual notes themselves may be used as product demos, movie trailers, virtual billboards, virtual banners, or other types of advertisements. For example, such virtual notes may include content 112 that includes one or more advertisement features. Such virtual note advertisements may be virtually provided at real world entities, including outside small businesses, on products/buildings/entities, etc. In an embodiment, virtual notes may be used as a point of sale (e.g., enabling ordering from within a certain distance of a location and picking up the order), for local inventory (e.g., enabling localized searches for items and prices in stores to be performed), and for further services for businesses. In an embodiment, businesses may be enabled to provide branded skins.

VII. Example Computer Implementation

Note that electronic devices 104 (FIG. 1), 1004 (FIG. 10), 1704 (FIG. 17), and 2300 (FIG. 23), and 3000 (FIG. 30), and server 2206 (FIGS. 22 and 26) may each include hardware, software, firmware, or any combination thereof to perform their respective functions. For example, any one or more of electronic devices 104, 1004, 1704, 2300, and 3000, and server 2206 may include computer code configured to be executed in one or more processors. Alternatively or additionally, any one or more of electronic devices 104, 1004, 1704, 2300, and 3000, and server 2206 may include hardware logic/electrical circuitry.

In an embodiment, electronic devices 104, 1004, 1704, 2300, and 3000, and server 2206 may each be implemented in one or more computers, including a personal computer, a mobile computer (e.g., a laptop computer, a notebook computer, a handheld computer such as a personal digital assistant (PDA) or a Palm™ device, etc.), or a workstation, or other electronic device type described elsewhere herein. These example devices are provided herein purposes of illustration, and are not intended to be limiting. Embodiments of the present invention may be implemented in further types of devices, as would be known to persons skilled in the relevant art(s).

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for enabling electronic devices 104, 1004, 1704, 2300, and 3000, and server 2206, flowchart 200 of FIG. 2, flowchart 900 of FIG. 9, flowchart 1600 of FIG. 16, flowchart 2700 of FIG. 27, and flowchart 2800 of FIG. 28, and/or further embodiments of the present invention described herein. Embodiments of the invention are directed to computer program products comprising such logic (e.g., in the form of software) stored on any computer useable medium. Such software, when executed in a processing unit (that includes one or more data processing devices), causes a device to operate as described herein.

Example Embodiments

In an embodiment, a method in an electronic device includes enabling a user to input content into a note, enabling the user to associate a virtual representation of the note with an entity, and enabling the user to position the virtual representation of the note in a virtual space superimposed on the entity.

The entity may be a living being, an object, or a geographical location, the enabling of the user to associate a virtual representation of the note with an entity may include enabling the user to associate the virtual representation of the note with a living being, an object, or a geographical location.

The method may further include enabling the user to configure at least one attribute associated with the note.

The at least one attribute may include at least one of a viewing permission, an expiration date, a metadata, or an alert setting.

The method may further include transmitting the note to a notes database.

The enabling of the user to associate a virtual representation of the note with an entity may include determining a location of the user, and associating the virtual representation of the note with the determined location of the user.

The enabling of the user to associate a virtual representation of the note with an entity may include enabling the user to select the entity on a map displayed by an electronic device, and associating the virtual representation of the note with the selected entity.

The enabling of the user to position the virtual representation of the note in a virtual space superimposed on the entity may include enabling the user to modify an orientation of the virtual representation of the note in the virtual space.

In another embodiment, an electronic device may include a display, a user interface configured to enable a user to input note content, a note processing module configured to receive the note content from the user interface, to generate a note that includes the note content, and to associate an entity with the note, and a rendering module configured to generate a virtual representation of the note to be displayed in the display in a virtual space superimposed on the entity. The user interface may be configured to enable the user to position the virtual representation of the note in the virtual space.

The entity may be a living being, an object, or a geographical location.

The note processing module may be configured to enable the user to configure at least one attribute associated with the note.

The at least one attribute may include at least one of a viewing permission, an expiration date, a metadata, or an alert setting.

The electronic device of claim 21 may further include a communication module configured to transmit the note to a notes database.

The electronic device may further include a location determiner configured to determine a location of the electronic device. The note processing module may be configured to associate the virtual representation of the note with the determined location of the electronic device as the entity.

The user interface may be configured to enable the user to select the entity on a map displayed by an electronic device. The note processing module may be configured to associate the virtual representation of the note with the selected entity.

The user interface may be configured to enable the user to modify an orientation of the virtual representation of the note in the virtual space.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a notes server, comprising:
   detecting, by a processor, an interaction of a first user with an entity, when the first user is in a geographic proximity of the entity;
   detecting, by the processor, that a second user viewed the entity on a map displayed by an electronic device of the second user;
   determining, by a processor, one or more notes associated with the entity;
   transmitting, by a processor, an alert signal to an electronic device of the first user indicating association of the one or more notes with the entity;
   transmitting, by a processor, another alert signal to the second user's electronic device indicating association of the one or more notes with the entity;
   receiving, by a processor, a request from the first user's electronic device for a note of the one or more notes in response to the alert;
   transmitting, by a processor, the note requested by the first user to the first user's electronic device, the first user's note including position information configured to enable the first user's electronic device to display a virtual representation of the note superimposed on the entity;
   receiving, by a processor, a request from the second user's electronic device for a note of the one or more notes in response to the other alert signal; and
   transmitting, by a processor, the note requested by the second user to the second user's electronic device, the second user's note including position information configured to enable the second user's electronic device to display a virtual representation of the note requested by the second user superimposed on the entity.

2. The method of claim 1, wherein the entity is a living being, an object, or a geographical location, wherein said detecting an interaction of a user with an entity comprises:
   detecting, by a processor, an interaction of the first user with a living being, an object, or a geographical location.

3. The method of claim 1, wherein said detecting an interaction by the user with the entity by determining that the user entered a region proximate to the entity comprises:
   detecting, by a processor, an interaction by the first user with the entity by determining that the first user entered the region proximate to the entity and that the first user's electronic device is oriented toward the entity.

4. The method of claim 1, further comprising:
   filtering, by a processor, the determined one or more notes based on at least one attribute associated with the determined one or more notes.

5. A notes engine, comprising:
   a processor; and
   a non-transitory processor readable storage medium that further comprises components executable by the processor, the components comprising:
   a location comparator configured to receive an indication of geographic proximity of a first user with an entity, and to determine one or more notes associated with the entity stored in a notes database; and
   a notes manager configured to transmit an alert signal to an electronic device of the first user to indicate the one or more notes associated with the entity, the notes manager further configured to transmit another alert signal to an electronic device of a second user on receiving an indication that the second user viewed the entity on a map displayed by the second user's electronic device;
   wherein the notes manager is configured to receive a request from each of the electronic devices of the first and second users for a respective note of the one or more notes in response to the alerts, and to transmit the respective requested notes to the respective electronic devices of the first and second users, the respective notes including respective position information configured to enable the respective electronic devices of the first and second users to display a respective virtual representation of the respective notes superimposed on the entity.

6. The notes engine of claim 5, wherein the entity is a living being, an object, or a geographical location.

7. The notes engine of claim 5,
   wherein the notes manager includes a notes filter configured to filter the determined one or more notes based on at least one attribute associated with the determined one or more notes;
   wherein the notes manager is configured to transmit the alert signals to indicate the filtered one or more notes; and
   wherein the notes manager is configured to receive the request from the first user's electronic device for the note of the filtered one or more notes in response to the alert, and to transmit the requested note to the first user's electronic device.

8. The notes engine of claim 7, wherein the at least one attribute includes at least one of a viewing permission, an expiration date, or a metadata.

9. The notes engine of claim 5, wherein the notes manager is configured to receive a second note from a third user, and to store the second note in the notes database.

10. The notes engine of claim 5, wherein the notes manager is configured to receive a version of the note transmitted to the first user's electronic device annotated with a comment from the first user, and to store the annotated version of the note in the notes database.

11. A non-transitory computer readable storage medium, comprising instructions, which when executed by a processor cause the processor to:
- detect an interaction of a first user with an entity, when the first user is in a geographic proximity with the entity;
- detect that a second user viewed the entity on a map displayed by an electronic device of the second user;
- determine, one or more notes associated with the entity;
- transmit an alert signal to an electronic device of the first user indicating association of the one or more notes with the entity;
- transmit another alert signal to an electronic device of the second user indicating association of the one or more notes with the entity;
- receive a request from the first user's electronic device for a note of the one or more notes in response to the alert;
- transmit the note requested by the first user to the first user's electronic device, the first user's note including position information configured to enable the first user's electronic device to display a virtual representation of the note superimposed on the entity;
- receive a request from the second user's electronic device for a note of the one or more notes in response to the other alert; and
- transmit the note requested by the second user to the second user's electronic device, the second user's note including position information configured to enable the second user's electronic device to display a virtual representation of the note superimposed on the entity.

* * * * *